United States Patent
Zhang et al.

(10) Patent No.: US 12,087,320 B1
(45) Date of Patent: Sep. 10, 2024

(54) ACOUSTIC EVENT DETECTION

(71) Applicant: Amazon Technologies, Inc., Seattle, WA (US)

(72) Inventors: Qin Zhang, Boston, MA (US); Qingming Tang, Cambridge, MA (US); Ming Sun, Winchester, MA (US); Chao Wang, Netwon, MA (US); Steve Mark Lorusso, Weston, MA (US); Andrew Thomas Bydlon, Cambridge, MA (US); James Garnet Droppo, Carnation, WA (US); Viktor Rozgic, Belmont, MA (US); Sripal Mehta, San Francisco, CA (US); Yang Liu, Los Altos, CA (US)

(73) Assignee: Amazon Technologies, Inc., Seattle, WA (US)

(*) Notice: Subject to any disclaimer, the term of this patent is extended or adjusted under 35 U.S.C. 154(b) by 390 days.

(21) Appl. No.: 17/671,194

(22) Filed: Feb. 14, 2022

(51) Int. Cl.
  *G10L 25/51* (2013.01)
  *G10L 15/18* (2013.01)
  *G10L 15/22* (2006.01)
  *G10L 15/30* (2013.01)

(52) U.S. Cl.
  CPC .......... *G10L 25/51* (2013.01); *G10L 15/1815* (2013.01); *G10L 15/22* (2013.01); *G10L 15/30* (2013.01)

(58) Field of Classification Search
  CPC ..... G10L 25/51; G10L 15/1815; G10L 15/22; G10L 15/30
  USPC ..................... 704/9, 239, 246, 251
  See application file for complete search history.

(56) References Cited

U.S. PATENT DOCUMENTS 10,832,535 B1 * 11/2020 Capota ................... G08B 29/10

* cited by examiner

*Primary Examiner* — George C Monikang
(74) *Attorney, Agent, or Firm* — Pierce Atwood LLP

(57) ABSTRACT

A system may be configured to detect custom acoustic events, where the system generates an acoustic event profile for the custom acoustic event based on a natural language description provided by a user and using an audio sample of the described acoustic event. For example, the user may describe the custom acoustic event as "dog bark." The system may ask the user questions to refine the description (e.g., dog breed, dog gender, age, etc.). Using an audio sample of the refined description, the system may then determine that audio captured in the user's environment is a potential sample of the custom acoustic event. Such captured audio may be presented to the user for confirmation, and then may be used to detect future occurrences of the custom acoustic event in the user's environment.

20 Claims, 13 Drawing Sheets

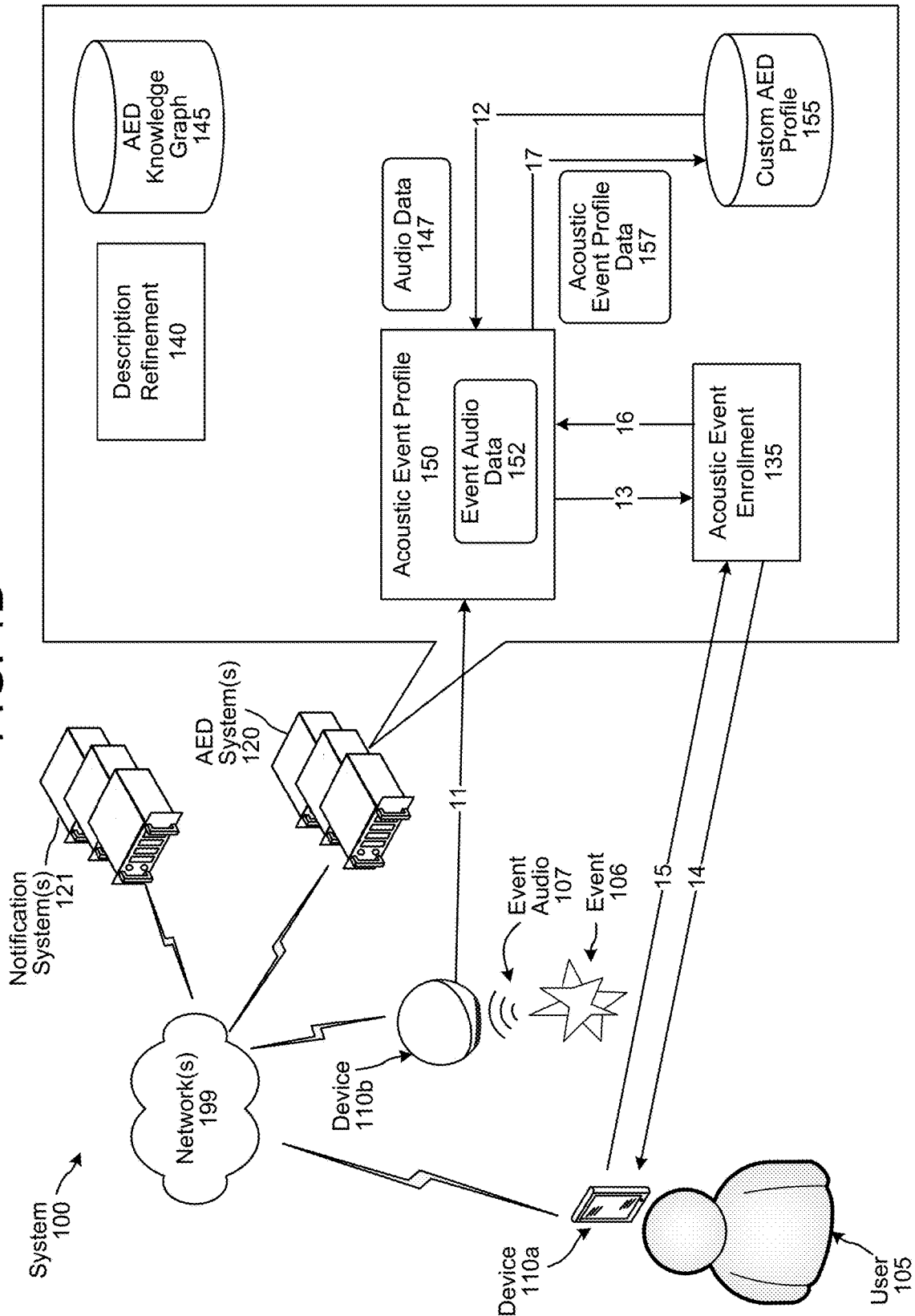

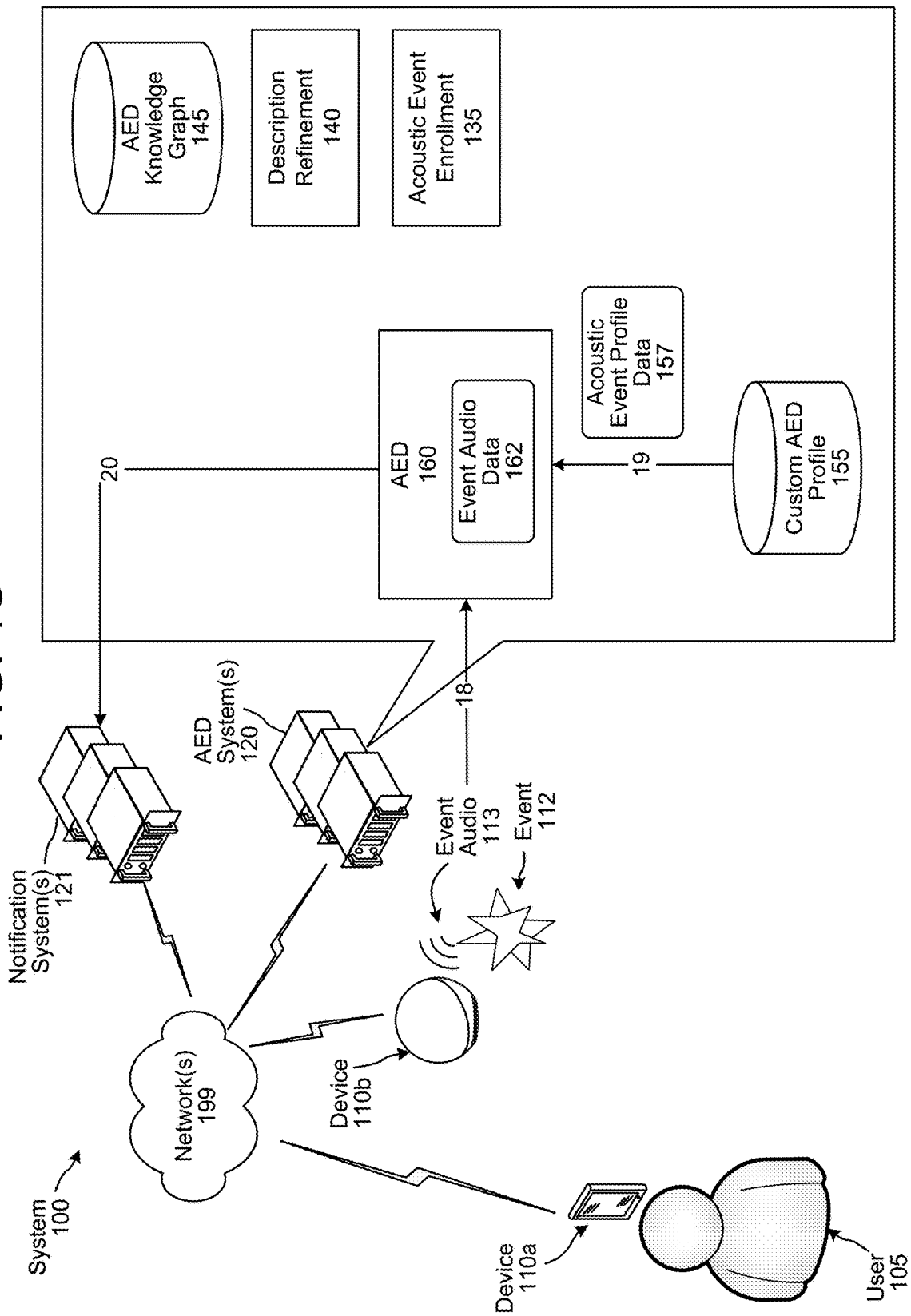

ACOUSTIC EVENT DETECTION

BACKGROUND

Computing devices may be configured to process sounds captured by a microphone and to take actions corresponding to the sound. The sounds may include non-speech events and/or human speech. An acoustic-event detection (AED) may be configured to recognize one or more non-speech sounds. A speech-processing system may allow a user to control computing devices using their speech. These systems identify words spoken by a user based on properties of received audio data that represents the speech of the user. Automatic speech-recognition (ASR) processing combined with natural-language understanding (NLU) processing allows a speech-processing system to determine text or other type of data corresponding to the speech and to understand an intent expressed in the speech. Acoustic-event detection and/or speech processing may be used by computers, hand-held devices, smart speakers, and other devices to improve human-computer interactions.

BRIEF DESCRIPTION OF DRAWINGS

For a more complete understanding of the present disclosure, reference is now made to the following description taken in conjunction with the accompanying drawings.

FIG. 1B illustrates the system configured to determine acoustic event profile data to detect the custom acoustic event, according to embodiments of the present disclosure.

FIG. 1C illustrates the system configured to detect occurrence of the custom acoustic event, according to embodiments of the present disclosure.

DETAILED DESCRIPTION

Figure 1A:
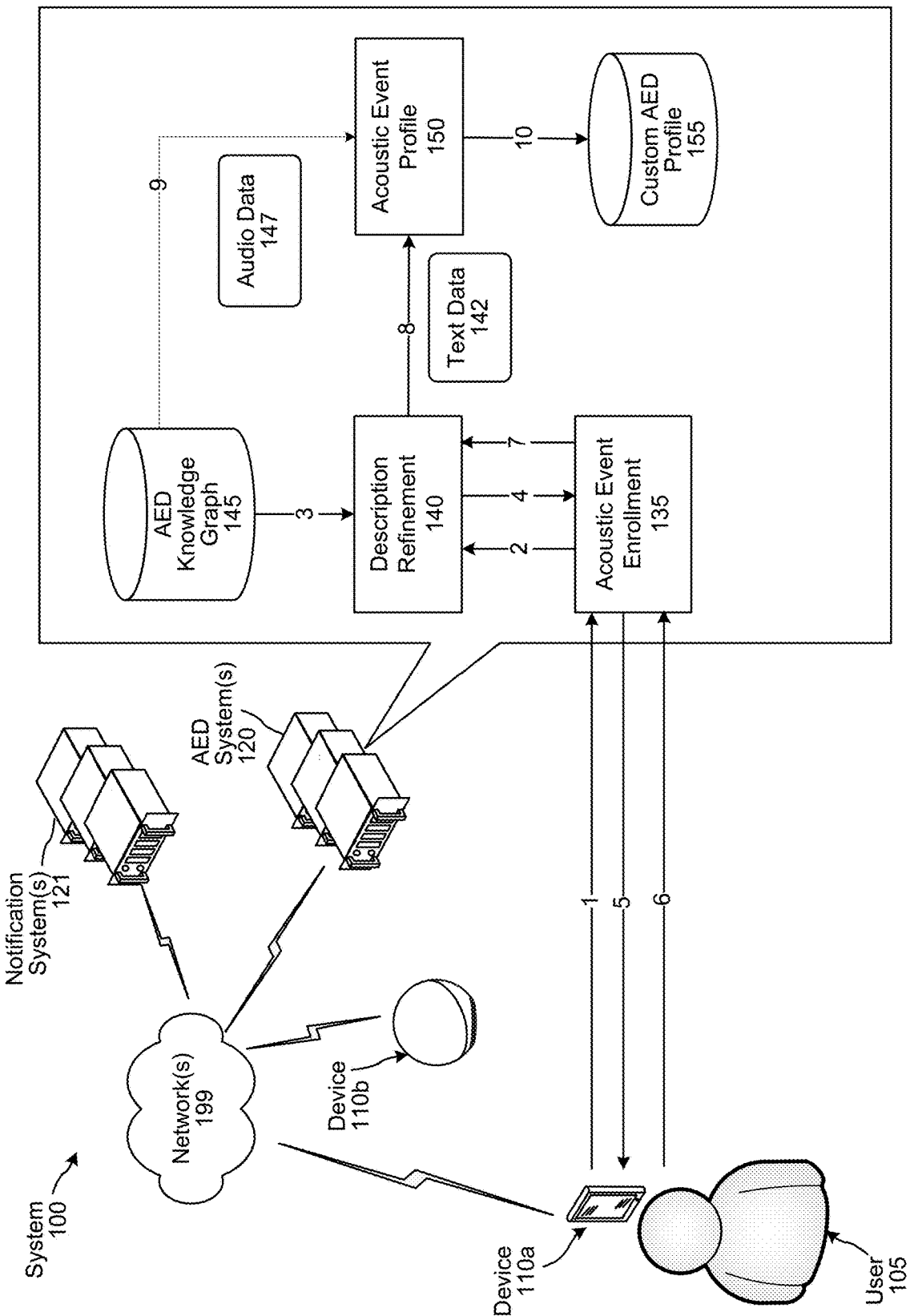
FIG. 1A illustrates a system configured to receive and process a request to detect a custom acoustic event, according to embodiments of the present disclosure.

Acoustic-event detection is a field of computer science and artificial intelligence that relates to processing audio data representing a sound, such as a non-speech sound, to determine when and if a particular acoustic event is represented in the audio data. Automatic-speech recognition (ASR) is a field of computer science, artificial intelligence, and linguistics that relates to transforming audio data representing speech into text data representing that speech. Natural-language understanding (NLU) is a field of computer science, artificial intelligence, and linguistics that relates to enabling computers to derive meaning from the text data. Text-to-speech (TTS) is a field of computer science, artificial intelligence, and linguistics that relates to enabling computers to convert a representation of text into audio representing synthesized speech. ASR and/or NLU may be used together as part of a natural language processing system. In other embodiments, systems may use spoken language understanding (SLU) techniques that processes audio data representing speech and determines meaning of the speech. A system may also be capable of acoustic event detection (AED), that is detecting events that have one or more distinctive sounds that allow the system to determine when they occur. Examples of such events may include glass breaking, a baby crying, or other events. A system capable of performing speech processing may also be capable of performing AED. In various embodiments, the natural language processing system may process data associated with an acoustic event (e.g., audio data that includes a representation of the event and/or event data generated by the AED system) and/or speech data associated with the event and may determine a corresponding output (e.g., sending a notification to a user device).

A device and/or a system may thus be configured to process audio data to determine if properties of the audio data correspond to properties associated with an acoustic event. Examples of acoustic events include a doorbell ringing, a microwave oven beeping, a dog barking, a window pane (or other glass) breaking, and/or a door closing. The device and/or the components of the larger system may process the audio data in groups of samples, known as frames of audio data, to extract audio features from the audio data as it is received. The audio features may include, for example, log Mel-filterbank energy features corresponding to the audio data frames. An acoustic event detection (AED) component may process the audio features.

A voice-controlled device and/or other audio-receiving system component(s) may also be configured to receive a spoken user input and detect a wakeword and/or other text in the user input; determine a command in the user input; and provide a response to the command. A user may thus interact with the voice-controlled device, another device, and/or system by voice. In some embodiments, in response to the device detecting the wakeword, the user device may perform speech processing on audio data representing the speech of the user, and/or send the audio data to the system for processing. The system may further process the audio data to verify that it includes a representation of the wakeword and/or to determine the command and/or response. The device may then receive, from the system, output audio, video, or other data related to the response and/or other data required to perform an action associated with the response (e.g., a command to turn on a light).

An AED component may be configured to detect occurrence of some predefined acoustic events, such as, glass breaking, fire/smoke alarm, etc. Such "predefined" events may correspond to events that may sound similar across environments and thus may be detectable by a globally trained/configured AED component that is then operable by a device with little to no customization. Another AED component may be configured to detect custom acoustic events defined by a user. Such custom acoustic events may be defined using audio samples of the acoustic event. For example, an AED component may be configured to detect a particular dog bark using audio samples of the dog barking, the sound of a particular beeping appliance, the sound of a particular door opening/closing, or the like.

The present disclosure relates to using a natural language description of a custom acoustic event to identify audio samples that potentially represent the custom acoustic event. A system of the present disclosure receives a natural language description, from a user, of the custom acoustic event. For example, "this is the sound of my toaster beeping." The system may refine the user-provided natural language description to determine a more specific version by requesting additional information from the user. For example, the user may provide the natural language description "dog barking", and the system may determine, based on additional information provided by the user, the natural language description "[breed] puppy barking." The system then identifies audio of a sample acoustic event corresponding to the determined natural language description, and may use the identified audio to detect occurrence of the custom acoustic event.

In some embodiments, the system analyzes non-speech audio captured by one or more devices associated with the user, and determines, using the identified audio data, whether the non-speech audio represents occurrence of the custom acoustic event. In the case that the captured non-speech audio represents an occurrence of the custom acoustic event, the system uses the captured non-speech audio to detect future occurrences of the custom acoustic event.

Some embodiments involve use of one or more knowledge graphs to determine natural language descriptions of a custom acoustic event and to identify audio data corresponding to the natural language descriptions. A knowledge graph may be used to integrate information from various data sources, model underlying relationships between the information, among other things. A knowledge graph can encode or otherwise represent knowledge in a form that is amenable to automated analysis, inference, and information retrieval. Some embodiments of the present disclosure use an AED-specific knowledge graph to represent hierarchical relationships of different acoustic events such that similar acoustic events (such as "dog bark" and "dog whimper") are interlinked together and dissimilar events (such as "cat meow" and "machine whir") are far apart. The knowledge graph may be represented by data, such as one or more tables of data, representing nodes of individual sounds/descriptions thereof and arcs connecting those sounds.

One knowledge graph, referred to herein as AED text graph, may integrate natural language descriptions (e.g., text data) of acoustic events. The natural language descriptions may be derived from various public sources (as described below) and/or other sources to build a comprehensive AED domain knowledge using text embeddings. Such an approach is advantageous because it uses natural language processing (NLP) representation learning to acquire label representations from rich text data that comprehensively describes different acoustic events. Using the relationships between the natural language descriptions, relationships between the acoustic events can be inferred, even when an audio sample of the acoustic event is not available.

Some embodiments incorporate a "conversational machine", which systematically prompts follow-up questions based on the user provided natural language description. Such a mechanism allows the system to better gauge the users' intents of the custom acoustic event detectors they wish to build by collecting more detailed and fine-grained natural language descriptions without hurting the user experience. The user-provided descriptions can be used to reduce domain-mismatch between the text data extracted from public sources and the user-provided descriptions.

Teachings of the present disclosure may be configured to incorporate user permissions and may only perform activities disclosed herein if approved by a user. These permissions may include a grant (or denial) to use a particular component/method. The systems, devices, components, and techniques described herein may thus be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A illustrates how a system 100 may receive and process a request to detect a custom acoustic event. FIG. 1B illustrates how the AED system(s) 120 may determine acoustic event profile data to detect the custom acoustic event. FIG. 1C illustrates how the AED system(s) 120 may detect occurrence of the custom acoustic event using acoustic event profile data. Although the figures and discussion of the present disclosure illustrate certain operational steps of the system in a particular order, the steps described may be performed in a different order (as well as certain steps removed or added) without departing from the intent of the disclosure.

As shown in FIGS. 1A-1C, the system 100 may include one or more devices 110 in communication with an acoustic event detection (AED) system(s) 120 over a network(s) 199. The system 100 may also include a notification system(s) 121 in communication with the devices 110 and/or the AED system(s) 120. A device 110a may be local to a user 105. A device 110b may be within an environment (e.g., home, office, vehicle, etc.) of the user 105. The network(s) 199 may include the Internet and/or any other wide- or local-area network, and may include wired, wireless, and/or cellular network hardware.

Referring to FIG. 1A, the user 105 may provide one or more inputs via the device 110a. The input(s) may indicate that the user 105 wants the AED system(s) 120 to detect a custom acoustic event. Such input(s) may be provided via a companion application installed at the device 110a, and may be in various forms, for example, typed/text input, selection of graphical user interface elements (for example, elements representing language choices potentially describing an acoustic event), voice input, etc. The input(s) may include a natural language description for the custom acoustic event. For example, the natural language description may be "dog barking" or "fridge door alarm." The device 110a may send (step 1), to the AED system(s) 120, data representative of the natural language description for the custom acoustic event. The data may be text data, token data or other natural language representation data.

The AED system(s) 120 may include an acoustic event enrollment component 135 configured to facilitate enrollment for custom acoustic events detection. In some embodiments, the acoustic event enrollment component 135 may process the data (received in step 1), for example, determine texting embedding data corresponding to the natural language description. The acoustic event enrollment component 135 may send (step 2) the data or the text embedding data corresponding to the natural language description to a description refinement component 140.

The AED system(s) 120 include the description refinement component 140 configured to determine, in some cases, another or additional natural language description for the custom acoustic event. The description refinement component 140 may employ a rule-based engine to determine further natural language descriptions based on the user-provided natural language description. In some embodiments, the description refinement component 140 may be a conversational engine that may engage in a dialog exchange with the user 105 to determine the further natural language descriptions. The dialog exchange may involve a speech-based exchange, where the user 105 may provide voice inputs and the device 110*a* may output audio representing synthesized speech. In other cases, the dialog exchange may involve a visual-based exchange, where the user 105 may provide inputs (e.g., text, selection of GUI elements, etc.) and the device 110*a* may display text, graphics, icons, etc.

The description refinement component 140 enables collection of more detailed and fine-grained descriptions of a custom acoustic event by presenting options for further descriptions or asking questions regarding the initial description. For example, if the user-provided initial natural language description for a custom acoustic event is "dog barking", the description refinement component 140 may present output data representing "Is the dog a puppy?" or "Is it a puppy?" In response, the user 105 may provide an input (e.g., via touch selection, voice input, gesture, etc.) indicating "yes" or "no." As a further example, the description refinement component 140 may present output data representing "What is dog breed?" or "What kind of dog is it?" In response, the user 105 may provide an input indicating the breed/kind of dog. The responsive user inputs may be used to determine further or another natural language description for the custom acoustic event. For example, the description refinement component 140 may determine the natural language description of the custom acoustic event to be "[dog breed] puppy barking," based on the responsive user inputs.

In another example, if the user-provided initial natural language description for a custom acoustic event is "fridge door alarm", the description refinement component 140 may present output data representing "What is the fridge's brand?" In response, the user 105 may provide an input indicating the brand. The description refinement component 140 may determine the natural language description of the custom acoustic event to be "[brand] fridge door alarm," based on the responsive user inputs.

The description refinement component 140 may use a rule-based engine to determine the questions to present or type of information to request from the user 105 based on the initial natural language description provided by the user 105. In other embodiments, the description refinement component 140 may determine the questions or type of information based on data stored at an acoustic event detection (AED) knowledge graph storage 145.

The AED knowledge graph storage 145 may store AED text graph data 410 (shown in FIG. 4) representing multiple text embedding data (or word embedding data) corresponding to natural language descriptions of various different acoustic events. The AED text graph data 410 may cluster text embedding data based on semantic similarities. For example, text embedding data corresponding to "puppy barking" may be located close to text embedding data corresponding to "dog barking." Further details on the data stored at the AED knowledge graph storage 145 are described below in relation to FIG. 4.

The description refinement component 140 may determine first text embedding data corresponding to the initial natural language description (e.g., "dog barking") provided by the user 105. Then the description refinement component 140 may retrieve (step 3), from the AED knowledge graph storage 145, at least second text embedding data that is semantically similar to the first text embedding data. The retrieved second (or more) text embedding data may correspond to a natural language description (e.g., "puppy barking", "female dog barking", "male dog barking", "[breed] dog barking", etc.). Using at least the second text embedding data, the description refinement component 140 may determine a question or other form of output to present to the user 105. The output may be in the form of text data (or other type of data) and may represent a natural language output. In some embodiments, the description refinement component 140 may use natural language generation (NLG) techniques (implemented within the component 140 or as a separate component) to determine the natural language output. The description refinement component 140 may send (step 4) the output to the acoustic event enrollment component 135.

In some embodiments, the acoustic event enrollment component 135 may process the output received from the description refinement component 140 to present to the user 105 as displayed output or synthesized speech. For example, the acoustic event enrollment component 135 may send the output to a text-to-speech (TTS) component (for example included in the AED system(s) 120 and configured to process in a similar manner as a TTS component XXA80/380) to generate audio data representing synthesized speech. The acoustic event enrollment component 135 may send (step 5), to the device 110*a*, output data (e.g., text data, audio data, etc.) to present to the user 105, where the output data is based on the output received from the description refinement component 140. Presenting of the output may cause the device 110*a* to present a question or request for information, for example, "Is it a puppy?", "What is the dog breed?", "What is the fridge brand," etc.

In response to the output data, the user 105 may provide a user input via the device 110*a*, which may represent an answer to the question or provide the requested information. The device 110*a* may send (step 6), to the acoustic event enrollment component 135, input data corresponding to the user input. The acoustic event enrollment component 135, in turn, may send (step 7) the input data to the description refinement component 140.

The description refinement component 140 may determine, based on any additional text embedding data retrieved from the AED knowledge graph 145 (in step 3), whether additional information is needed to further refine the natural language description for the custom acoustic event. If additional information is needed, the description refinement component 140 may cause additional questions or requests for information to be presented in a similar manner as described above in relation to steps 4 and 5. As described below in relation to FIG. 4, one node/natural language description may be connected to one or more nodes/other natural language descriptions in the AED text graph data 410. For example, a node representing "dog sound" may be connected to nodes representing "dog bark", "dog snort", "dog whine", etc. The "dog bark" node may be connected to further nodes representing "puppy bark", "[first breed] dog bark", etc. Based on these connected nodes, which may be retrieved from the AED knowledge graph 145, the description refinement component 140 may determine whether additional information is needed, and determine the type of questions to elicit the additional information. The description refinement component 140 may receive additional information (in a similar manner as described in relation to step 6) related to the natural language description of the custom acoustic event.

Using the user input(s) responsive to the questions or requests presented at the device 110*a* and the initial natural language description provided by the user 105, the description refinement component 140 may determine a natural language description for the custom acoustic event that the user 105 wants the AED system(s) 120 to detect. The description refinement component 140 may send (step 8), to an acoustic event profile component 150, text data 142 (or text embedding data) representing the determined natural language description for the custom acoustic event. For example, the text data 142 may correspond to "[breed] puppy dog barking", "[brand] fridge door alarm", etc.

The acoustic event profile component 150 may be configured to determine acoustic event profile data to be used to ultimately detect occurrence of the custom acoustic event. Based on the received natural language description, the acoustic event profile component 150 may retrieve (step 9), from the AED knowledge graph storage 145, audio data 147 corresponding to the text data 142. The audio data 147 may be determined from public sources or other sources, and may be an audio sample of an acoustic event associated with the natural language description represented in the text data 142. The audio data 147 may not be captured from the user 105 environment by the device(s) 110 associated with the user 105. The audio data 147 may be audio embedding data. In addition to the AED text graph data 410, the AED knowledge graph storage 145 may store also AED audio graph data 420 (shown in FIG. 4) representing multiple audio embedding data corresponding to various different acoustic events. The AED knowledge graph storage 145 may further store data associating individual audio embedding data to corresponding text embedding data describing the respective acoustic event. For example, text embedding data corresponding to "dog barking" may be associated with audio embedding data corresponding to audio representing a dog bark. Further details on the data stored at the AED knowledge graph storage 145 are described below in relation to FIG. 4.

The acoustic event profile component 150 may store (step 10) the audio data 147 in a custom AED profile storage 155. The audio data 147 may be associated with a natural language description for the custom acoustic event, for example, the text data 142. Additionally, the audio data 147 may be associated with a user profile identifier associated with the user 105. In this manner, the AED system(s) 120 can determine audio data (from stored data) corresponding to a custom acoustic event based on a natural language description of the custom acoustic event.

In some embodiments, the user 105 may enroll in an AED service via the companion application for the AED system(s). In enrolling in the AED service, the user 105 may provide authorization or permission for one or more devices 110, associated with a user profile of the user 105, to monitor and capture non-speech audio occurring proximate to the devices 110. Now referring to FIG. 1B, the device 110*b* may capture event audio 107 from an event 106 that may occur within an environment of the device 110*a*, where the environment may be an area surrounding the device 110*a*, and the device 110*a* is capable of "hearing"/capturing sounds occurring within the environment. The device 110*a* may determine that the event audio 107 is non-speech audio, and may send (step 11) event audio data 152, corresponding to the event audio 107, to the AED system(s) 120. The AED system(s) 120 may process the event audio data 152 using the acoustic event profile component 150.

The acoustic event profile component 150 may retrieve (step 12) the audio data 147 from the custom AED profile storage 155. The acoustic event profile component 150 may determine a user profile identifier associated with the device 110*b*, and may use the user profile identifier to retrieve the audio data 147. In some cases, the acoustic event profile component 150 may retrieve multiple different audio data, associated with the user profile identifier, from the custom AED profile storage 155.

The acoustic event profile component 150 may process the event audio data 152 (or corresponding audio embedding data) with respect to the audio data 147 (or corresponding audio embedding data) to determine similarity data representing a similarity between the event audio data 152 and the audio data 147. The acoustic event profile component 150 may determine the similarity data using various techniques, for example, using a cosine similarity, using a number of overlapping data points within a feature space, using a distance between data points within a feature space, etc. The acoustic event profile component 150 may determine that the event audio data 152 corresponds the same or similar acoustic event represented by the audio data 147 when the similarity data satisfies a condition (e.g., a threshold similarity value). The similarity data may include one or more numerical values or a vector of values, and the condition may be represented as single numerical value, in which case an average of the values in the similarity data may be used to determine whether the condition is satisfied. In determining that the event audio data 152 corresponds to the audio data 147, the acoustic event profile component 150 may determine that the event audio data 152 represents a sample of the custom acoustic event, corresponding to the audio data 147, that the user 105 wants the AED system(s) 120 to detect.

The acoustic event profile component 150 may send (step 13) the event audio data 152 to the acoustic event enrollment component 135. The acoustic event enrollment component 135 may send (step 14) the event audio data 152 to the device 110*a* for presenting to the user 105. Along with the event audio data 152, the acoustic event enrollment component 135 may also send output data requesting a user input indicating whether or not the event audio data 152 corresponds to the custom acoustic event that the user 105 wants the AED system(s) 120 to detect. The output data may also include a natural language description of the custom acoustic event represented in the audio data 147. The output data may be synthesized speech or displayed output. For example, the acoustic event enrollment component 135 may cause the device 110*a* to output the event audio data 152 and display text "Is this the [breed] puppy barking?" As another example, the device 110*a* may output the event audio data 152 and display text "Is this the [brand] fridge door alarm?" In some embodiments, the output data and the event audio data 152 may be presented by the companion application of the AED system(s) 120. The companion application may output a notification at the device 110*a* indicating that there is a message or action requiring the user's attention. The user 105 may open the notification, in response to which, the output data and the event audio data 152 may be presented.

The user 105 may provide one or more inputs, via the device 110a, in response to the output data and the event audio data 152. The user input(s) may be speech, selection of GUI elements, entry of text, gesture, etc. For example, the user input(s) may be an affirmative input indicating that the event audio data 152 is a sample of the custom acoustic event. As another example, the user input(s) may be a negative input indicating that the event audio data 152 is not a sample of the custom acoustic event. The device 110a may send (step 15) input data corresponding to the user input(s) to the acoustic event enrollment component 135.

In some embodiments, the acoustic event enrollment component 135 may send (at the step 14) multiple different event audio data that may be determined to be samples of the custom acoustic event represented in the audio data 147. The AED system(s) 120 may receive multiple event audios corresponding to multiple different events that near one or more of the devices 110 associated with the user profile identifier for the user 105. In such cases, the acoustic event enrollment component 135 may present output data requesting a user input with respect to the each individual event audio data. For example, the acoustic event enrollment component 135 may display text "Is this the [breed] puppy barking?" and output first event audio data. After receiving a user input with respect to the first event audio data, the acoustic event enrollment component 135 may display text "How about this?" or "Is this also the [breed] puppy barking?" and output second event audio data. In some embodiments, the device 110a may send separate input data for the separate user input(s) relating to the each individual event audio data presented to the user 105. In other embodiments, the device 110a may send input data corresponding to the cumulative user inputs provided by the user 105 relating to all of the event audio data presented to the user 105.

The acoustic event enrollment component 135 may send (step 16) the input data, received from the device 110a, to the acoustic event profile component 150. Based on an affirmative response represented in the input data, the acoustic event profile component 150 may use the event audio data 152 to determine acoustic event profile data 157 for the custom acoustic event. Based on a negative response represented in the input data, the acoustic event profile component 150 may not use the event audio data 152 to determine the acoustic event profile data 157 for the custom acoustic event. In some embodiments, the acoustic event profile component 150 may determine audio embedding data (or encoded representation) corresponding to the event audio data 152, and store as the acoustic event profile data 157. Details on how the acoustic event profile component 150 may determine the acoustic event profile data 157 are described below in relation to FIG. 6. In cases where multiple instances of event audio data is affirmed by the user 105 as representing the custom acoustic event, the acoustic event profile component 150 may aggregate the event audio data or aggregate audio embedding data (or encoded representations) corresponding to the individual event audio data, and store the aggregated data as the acoustic event profile data 157.

The acoustic event profile component 150 may store (step 17) the acoustic event profile data 157 in the custom AED profile storage 155. The acoustic event profile data 157 may be associated with a natural language description for the custom acoustic event, for example, the text data 142. Additionally, the acoustic event profile data 157 may be associated with the user profile identifier associated with the user 105. In some embodiments, the acoustic event profile data 157 may be stored in addition to the audio data 147 in the custom AED profile storage 155. In other embodiments, the acoustic event profile data 157 may be stored instead of or may replace the audio data 147 in custom AED profile storage 155. In yet other embodiments, the acoustic event profile component 150 may determine the acoustic event profile data 157 using the event audio data 152 and the audio data 147. In this manner, the AED system(s) 120 may determine the acoustic event profile data 157 by detecting acoustic events that occur within the user's environment and determining such acoustic events potentially correspond to the custom acoustic event.

Using the acoustic event profile data 157, the AED system(s) 120 may detect occurrence of the custom acoustic event using a comparison-based technique. Referring to FIG. 1C, the AED system(s) 120 may include an AED component 160 configured to detect occurrence of custom acoustic events. The device 110b (or another device 110 associated with the user profile identifier for the user 105) may capture event audio 113 from an event 112 that may occur within an environment of the device 110b, where the environment may be an area surrounding the device 110b, and the device 110b is capable of "hearing"/capturing sounds occurring within the environment. The device 110b may send (step 18) event audio data 162 corresponding to the event audio 113 to the AED system(s) 120. In some embodiments, the device 110b may process the event audio 113 using an acoustic front end (AFE) component 230 (shown in FIG. 2) for processing. The AFE component 230 may be configured to process the event audio 113 and determine corresponding event audio data 162, which may be acoustic feature data.

The AED component 160 may retrieve (step 19) the acoustic event profile data 157 from the custom AED profile storage 155. The acoustic event profile data 157 may be retrieved based on the user profile identifier associated with the device 110b. The AED component 160 may process the event audio data 162 with respect to the acoustic event profile data 157 to determine whether the event audio data 162 corresponds to the custom acoustic event represented in the acoustic event profile data 157. For example, the AED component 160 may determine similarity data representing a similarity between the event audio data 162 and the acoustic event profile data 157. The AED component 160 may determine the similarity data using various techniques, for example, using a cosine similarity, using a number of overlapping data points within a feature space, using a distance between data points within a feature space, etc. The AED component 160 may determine that the event audio data 162 corresponds the custom acoustic event represented by the acoustic event profile data 157 when the similarity data satisfies a condition (e.g., a threshold similarity value). The similarity data may include one or more numerical values or a vector of values, and the condition may be represented as single numerical value, in which case an average of the values in the similarity data may be used to determine whether the condition is satisfied. Further details of the AED component 160 are described below in relation to FIG. 5.

The AED component 160 may determine that the event audio data 162 represents occurrence of the custom acoustic event represented in the acoustic event profile data 157, in which case, the AED component 160 may send (step 20) detected event data to the notification system(s) 121. The detected event data may indicate which custom acoustic event occurred. For example, the detected event data may represent the natural language description for the custom acoustic event (e.g., the text data 142).

The notification system(s) 121 may generate notification data 756 (shown in FIG. 7) based on the detected event data. The notification system(s) 121 may send the notification data 756 to the device 110a (or another device 110) associated with the user profile identifier for the user 105. Further details regarding the notification output are described below in relation to FIG. 7.

In some embodiments, one or more of the operations described above may be performed by the device 110a, the device 110b or another device 110 associated with the user 105. For example, the device 110b may include an AED component 340 that is configured to process in a similar manner as the AED component 160 to detect occurrences of custom acoustic events. In such examples, the acoustic event profile data 157 may be determined by the AED system(s) 120, then provided to the device 110b and stored at a custom AED profile storage 345 included at the device 110b.

The AED system(s) 120 may also receive other data, which may include, for example, time data, image data, sensor data from other sensors in an environment, sensor data from a sensor(s) of the device(s) 110, or the like. Such other data may be used by the AED component 160 to determine whether a custom acoustic event occurred.

In some embodiments, the components of the AED component 160 may be configured after applying quantization techniques. Quantization is the process of transforming deep learning models to use parameters and computations at a lower precision. Some quantization techniques may involve a process of approximating a neural network that uses floating-point numbers by a neural network of low bit width numbers. Such techniques may reduce both the memory requirement and computational cost of using neural networks.

In some embodiments, the AED component 160 may employ streaming models. The system/device may are acquire data (e.g., audio data) sequentially over time. Rather than wait for data to be collected for the entire event 112, streaming models start processing the event audio 113 as it is received to begin identifying patterns, making decisions, etc. as the data is received.

Figure 2:
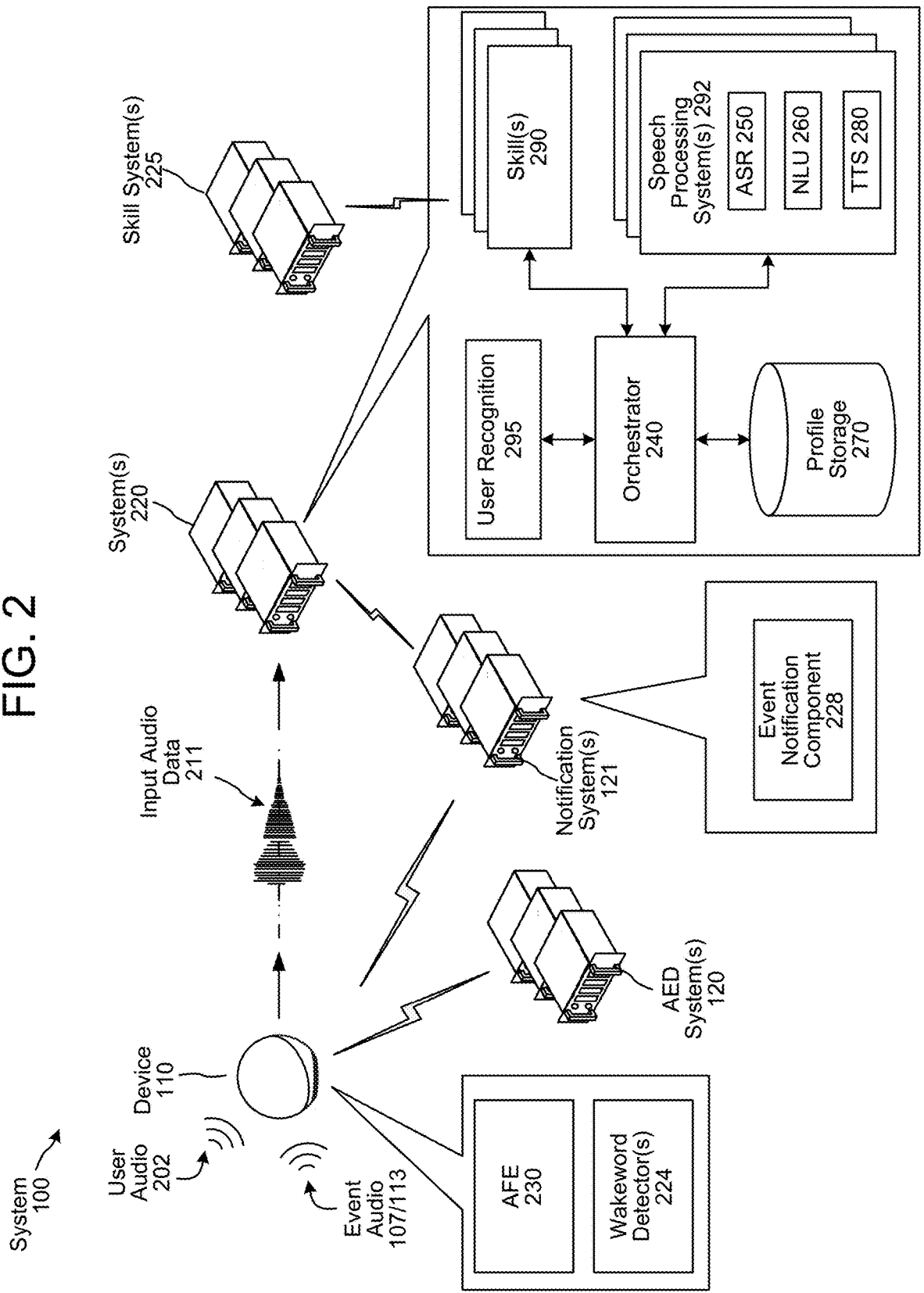
FIG. 2 is conceptual diagram illustrating a device, a system configured for detecting an acoustic event and a system for speech processing, according to embodiments of the present disclosure.

The system 100 may operate using various components as described in FIG. 2. The various components may be located on same or different physical devices. For example, as shown in FIG. 2, some components may be disposed on a device 110, while other components may be disposed on a system(s) 220; however, some or all of the components may be disposed on the device 110. Communication between various components may thus occur directly (via, e.g., a bus connection) or across the network(s) 199.

An audio capture component(s), such as a microphone or array of microphones (e.g., 820) of the device 110, captures input audio, such as the event audio 107, 113 and/or user audio 202 (e.g., speech/spoken inputs from a user(s)) and creates corresponding input audio data 211.

The device 110 may include an acoustic front end (AFE) component 230. The AFE component 230 may be configured to process the audio data 211 and determine acoustic feature data. The AFE component 230 may process the audio data 211 using a number of techniques, such as determining frequency-domain representations of the audio data 211 by using a transform such as a Fast Fourier transform (FFT) and/or determining a Mel-cepstrum corresponding to the audio data 211.

The AFE component 230 may include an analysis filterbank that processes one or more frames of the input audio data 211. The input audio data 211 may be a digital representation of an analog audio signal, which may represent the event 106 and correspond to the event audio 107 or the event 112 and correspond to the event audio 113. In other cases, where the device 110 captures audio data representing speech from the user 105, the audio data 211 may be a digital representation of an analog audio signal, which may represent the spoken input/user audio 202 from the user 105. The analysis filterbank may include hardware, software, and/or firmware for converting the time-domain representation of the audio data 211 into frequency-domain representation of the audio data 211. This conversion may be performed by implementing a Fourier transform algorithm, such as a fast Fourier transform (FFT) or discrete-time Fourier transform (DTFT). The analysis filterbank may further include two or more filters for separating the frequency range of the resultant frequency-domain audio data into two or more frequency ranges or bins. For example, the analysis filterbank may separate a frequency range of 20 Hz-20 kHz into 20 bins.

The AFE component 230 may include an energy estimation component, which may receive as input the frequency representation of the audio data 211, process the frequency representation to determine one or more values that represent an estimated energy of the frequency data, and output corresponding acoustic feature data for each audio frame. If M acoustic features are extracted, the acoustic feature data (e.g., acoustic feature data 522) may include one or more acoustic feature vectors of size M. The energy estimation component may include one or more filters that, given the frequency data, determine one or more magnitudes of audio energy for each bin of frequency data. These magnitudes may be represented by one or more integer and/or fixed-point values of the acoustic feature vector. The energy estimation component may determine the magnitudes by, for example, averaging the frequency data or performing a root-mean-square operation on the frequency data. The energy estimation component may, prior to processing the frequency data, convert the frequency data from a first frequency format (e.g., Hertz) to a second frequency format (e.g., Mel). The energy estimation component may then perform a logarithm operation to determine the log-filter-bank energies (LFBEs) of each bin. The acoustic feature data may thus include one or more LFBE vectors. In other embodiments, the energy estimation component may perform a linear cosine transform on the logarithm of the frequency data to determine Mel-frequency cepstrum coefficients (MFCC), which may instead or additionally be represented by the acoustic feature data. The dimension of each acoustic feature vector of the acoustic feature data may correspond to the number M of frequency bins.

In some embodiments, the AFE component 230 may process the audio data 211 as it is received/captured by the device 110 (i.e. in a streaming manner). As such, in some cases the audio data 211 may represent a portion of the event audio 107/113 or the user audio 202, and may not correspond to the entire event 106/107 or the entire spoken input from the user 105. For example, the event 106/112 may be a sound generated by an appliance, such as a beeping sound generated by a microwave, which may occur for 15 seconds. The device 110 may capture the corresponding event audio 107/113, and may generate the audio data 211 in 1-second increments/portions. In such cases, the acoustic feature data may correspond to the 1-second portion of the event audio 107/113.

In some embodiments, the AFE component 230 may process a portion/a set of frames of the audio data 211 at a time. For example, the AFE component 230 may perform windowing functions on the audio data 211 to create audio frames. The size of each audio frame may depend upon system configuration. In an example embodiment, each audio frame may include 25 milliseconds of the audio data 211, with an overlap of the next audio frame of 10 milliseconds of data, thus resulting in sliding window processing of the audio data 211. Performing a windowing function may include multiplying a time record by a finite-length window with an amplitude that varies smoothly and gradually toward zero at its edges. By performing such functions, the endpoints of the waveforms of respective frames of audio data meet, resulting in a continuous waveform without sharp transitions. The AFE component 230 may then perform further processing (e.g., FFT) that generates, from the waveforms in each audio frame, a corresponding acoustic feature vector included in the acoustic feature data.

In some embodiments, the device 110 may include one AFE component 230 that may process the audio data 211 to generate the acoustic feature data to be used by the AED component 160, and another AFE component 230 that may process the audio data 211 to generate acoustic feature data to be used by a wakeword detector 224. In other embodiments, the AFE component 230 may generate acoustic feature data that may be used by the AED component 160 and the wakeword detector 224.

The device 110 may also include one or more wakeword detectors 224 for detecting one or more wakewords for providing output and/or changing a state of the device 110, such as illuminating a light, activating a display screen, etc. As illustrated, the wakeword detector 224 is disposed on the device 110, while further speech-processing components are disposed on the system(s) 220. The present disclosure is not, however, limited to only this arrangement of components, and any other disposition of components is within the embodiments of the present disclosure. For example, some or all of the speech processing may be performed by the device 110, and the device 110 may thus not send any audio data 211 to the system(s) 220.

The device 110 may instead or in addition process the input audio data 211 to determine whether speech is represented therein. The device 110 may use various techniques to determine whether the input audio data 211 includes speech. In some examples, a voice-activity detector of the device 110 may apply voice-activity detection (VAD) techniques. Such VAD techniques may determine whether speech is present in audio data based on various quantitative aspects of the input audio data 211, such as the spectral slope between one or more frames of the audio data; the energy levels of the audio data in one or more spectral bands; the signal-to-noise ratios of the audio data in one or more spectral bands; or other quantitative or qualitative aspects. In other examples, the device 110 may include a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 224 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 224 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected by the wakeword detector(s) 224, the device 110 may begin transmitting the audio data 211 to the system(s) 220. The input audio data 211 may include data corresponding to the wakeword; in other embodiments, the portion of the audio corresponding to the wakeword is removed by the device 110 prior to sending the input audio data 211 to the system(s) 220. In the case of touch input detection, for example, the input audio data 211 may not include a wakeword.

In various embodiments, the wakeword detector(s) 224 may use one of a plurality of wakeword-detection models. Each model may be trained to detect a different wakeword. In some embodiments, a single model may detect multiple wakewords. Each wakeword may be associated with a different speech-processing system. Upon detection of a particular wakeword, the device 110 may send the audio data 211 (and/or an indication of detection of the wakeword) to its corresponding speech-processing system.

In various embodiments, the wakeword-detection model of the wakeword detector(s) 224 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 224 may determine a similarity score for the candidate wakeword based on how similar it is to the stored wakeword; if the similarly score is higher than the wakeword-detection threshold, the wakeword detector 224 determines that the wakeword is present in the audio data, and if the similarity score is less than the wakeword-detection threshold, the wakeword detector 224 determines that the wakeword not is present in the audio data. For example, if the candidate wakeword matches the stored wakeword very closely, the wakeword detector 224 may determine a similarity score of 100; if the candidate wakeword does not match the stored wakeword at all, the wakeword detector 224 may determine a similarity score of 0. If the wakeword detector 224 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Upon receipt by the system(s) 220 and/or upon determination by the device 110, the input audio data 211 may be sent to an orchestrator component 240. The orchestrator component 240 may include memory and logic that enables it to transmit various pieces and forms of data to various components of the system, as well as perform other operations as described herein. The orchestrator component 240 may be or include a speech-processing system manager and/or one or more of the speech-processing systems 292, which may be used to determine which, if any, of the ASR component 250, NLU component 260, and/or TTS component 280 should receive and/or process the audio data 211. In some embodiments, the orchestrator component 240 includes one or more ASR components 250, NLU components 260, TTS components 280, and/or other processing components, and processes the input audio data 211 before sending it and/or other data to one or more speech-processing components 292 for further processing. In other embodiments, the orchestrator component 240 sends the input audio data 211 to one or more of the speech-processing components 292 for processing.

In some embodiments, the orchestrator 240 and/or speech-processing system manager communicate with the speech-processing systems 292 using an application programming interface (API). The API may be used to send and/or receive data, commands, or other information to and/or from the speech-processing systems 292. For example, the orchestrator 240 may send, via the API, the input audio data 211 to a speech-processing systems elected by the speech-processing system manager and may receive, from the selected speech-processing system 292, a command and/or data responsive to the audio data 211.

Each speech-processing system 292 may include an ASR component 250, which may transcribe the input audio data 211 into text data. The text data output by the ASR component 250 may represent one or more than one (e.g., in the form of an N-best list) ASR hypotheses representing speech represented in the input audio data 211. The ASR component 250 may interpret the speech in the input audio data 211 based on a similarity between the audio data 211 and pre-established language models. For example, the ASR component 250 may compare the input audio data 211 with models for sounds (e.g., acoustic units such as phonemes, senons, phones, etc.) and sequences of sounds to identify words that match the sequence of sounds of the speech represented in the input audio data 211. The ASR component 250 sends ASR data generated thereby to an NLU component 260, via, in some embodiments, the orchestrator component 240. The ASR data sent from the ASR component 250 to the NLU component 260 may include a single top-scoring ASR hypothesis or may include an N-best list including multiple ASR hypotheses. An N-best list may additionally include a respective score associated with each ASR hypothesis represented therein. An ASR hypothesis may include text data or token data (e.g., sub-word representations) corresponding to the words recognized from the audio data 211.

Each speech-processing system 292 may further include a NLU component 260 that determines a semantic interpretation of the word(s) or phrase(s) represented in the ASR data by determining one or more meanings associated with the word(s) or phrase(s) represented in the ASR data. The NLU component 260 may determine an intent representing an action that a user desires be performed and may determine information that allows a device (e.g., the device 110, the system(s) 220, a skill component 290, a skill system(s) 225, etc.) to execute the intent. For example, if the ASR data corresponds to "play [song] by [artist]," the NLU component 260 may determine an intent that the system output music and may identify the indicated artist and the indicated song. For further example, if the ASR data corresponds to "what is the weather," the NLU component 260 may determine an intent that the system output weather information associated with a geographic location of the device 110. In another example, if the ASR data corresponds to "turn off the lights," the NLU component 260 may determine an intent that the system turn off lights associated with the device 110 or the user from whom the user audio 202 is received.

The NLU results data may be sent (via, for example, the orchestrator component 240) from the NLU component 260 (which may include tagged text data, indicators of intent, etc.) to a skill component(s) 290. If the NLU results data includes a single NLU hypothesis, the NLU component 260 may send the NLU results data to the skill component(s) 290 associated with the NLU hypothesis. If the NLU results data includes an N-best list of NLU hypotheses, the NLU component 260 may send the top scoring NLU hypothesis to a skill component(s) 290 associated with the top scoring NLU hypothesis. As described above, the NLU component 260 and/or skill component 290 may determine, using the interaction score, text data representing an indication of a handoff from one speech-processing system 292 to another.

A skill component 290 may be software running on the system(s) 220 that is, or is similar to, a software application. A skill component 290 may enable the system(s) 220 to execute specific functionality in order to provide data or produce some other requested output. The system(s) 220 may be configured with more than one skill component 290. For example, a weather service skill component may enable the system(s) 220 to provide weather information, a car service skill component may enable the system(s) 220 to book a trip with respect to a taxi or ride sharing service, a restaurant skill component may enable the system(s) 220 to order a pizza with respect to the restaurant's online ordering system, etc. A skill component 290 may operate in conjunction between the system(s) 220 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill system(s) 225 may communicate with a skill component(s) 290 within the system(s) 220 directly and/or via the orchestrator component 240. A skill system(s) 225 may be configured to perform one or more actions. A skill may enable a skill system(s) 225 to execute specific functionality in order to provide data or perform some other action requested by a user. For example, a weather service skill may enable a skill service(s) 225 to provide weather information to the system(s) 220, a car service skill may enable a skill system(s) 225 to book a trip with respect to a taxi or ride sharing service, an order pizza skill may enable a skill system(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system(s) 220 may include a skill component 290 dedicated to interacting with the skill system(s) 225. A skill, skill device, or skill component may include a skill component 290 operated by the system(s) 220 and/or skill operated by the skill system(s) 225.

The speech-processing system 292 may include a TTS component 280 that generates audio data (e.g., synthesized speech) from text data or other natural language representation data using one or more different methods. Data input to the TTS component 280 may come from a skill component 290, the orchestrator component 240, and/or another component of the system. The data may include an indication of a speech-processing component and/or data responsive to a command.

The system(s) 220 may include a user-recognition component 295 that recognizes one or more users associated with data input to the system(s) 220. The user-recognition component 295 may take as input the audio data 211 and/or ASR data output by the ASR component 250. The user-recognition component 295 may perform user recognition by comparing audio characteristics in the input audio data 211 to stored audio characteristics of users. The user-recognition component 295 may also perform user recognition by comparing biometric data (e.g., fingerprint data, iris data, etc.), received by the system in correlation with the present user input, to stored biometric data of users. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system(s) 220 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage may store data corresponding to detection of an acoustic event; if, for example, the user 105 configures a device 110 after defining an acoustic event, data from the profile storage 270 corresponding to the event may be sent to the device 110.

The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a device 110, the user profile (associated with the presented login information) may be updated to include information about the device 110. As described, the profile storage 270 may further include data that shows an interaction history of a user, including commands and times of receipt of commands. The profile storage 270 may further include data that shows when a second user was present to hear an indication of a handoff for a command uttered by a first user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 100 may include one or more notification system(s) 121 which may include an event notification component 228. Although illustrated as a separate system, notification system(s) 121 may be configured within system(s) 220, device 110, or otherwise depending on system configuration. For example, event notification component 228 may be configured within system(s) 220, device 110, or otherwise. The event notification component 228 may handle sending notifications/commands to other devices upon the occurrence of a detected acoustic event. The event notification component 228 may have access to information/instructions (for example as associated with profile storage 270 or otherwise) that indicate what device(s) are to be notified upon detection of an acoustic event, the preferences associated with those notifications or other information. The event notification component 228 may have access to information/instructions (for example as associated with profile storage 270 or otherwise) that indicate what device(s) are to perform what actions in response to detection of an acoustic event (for example locking a door, turning on/off lights, notifying emergency services, or the like. Further detail regarding the event notification component may be found below with regard to FIG. 7.

Figure 3:
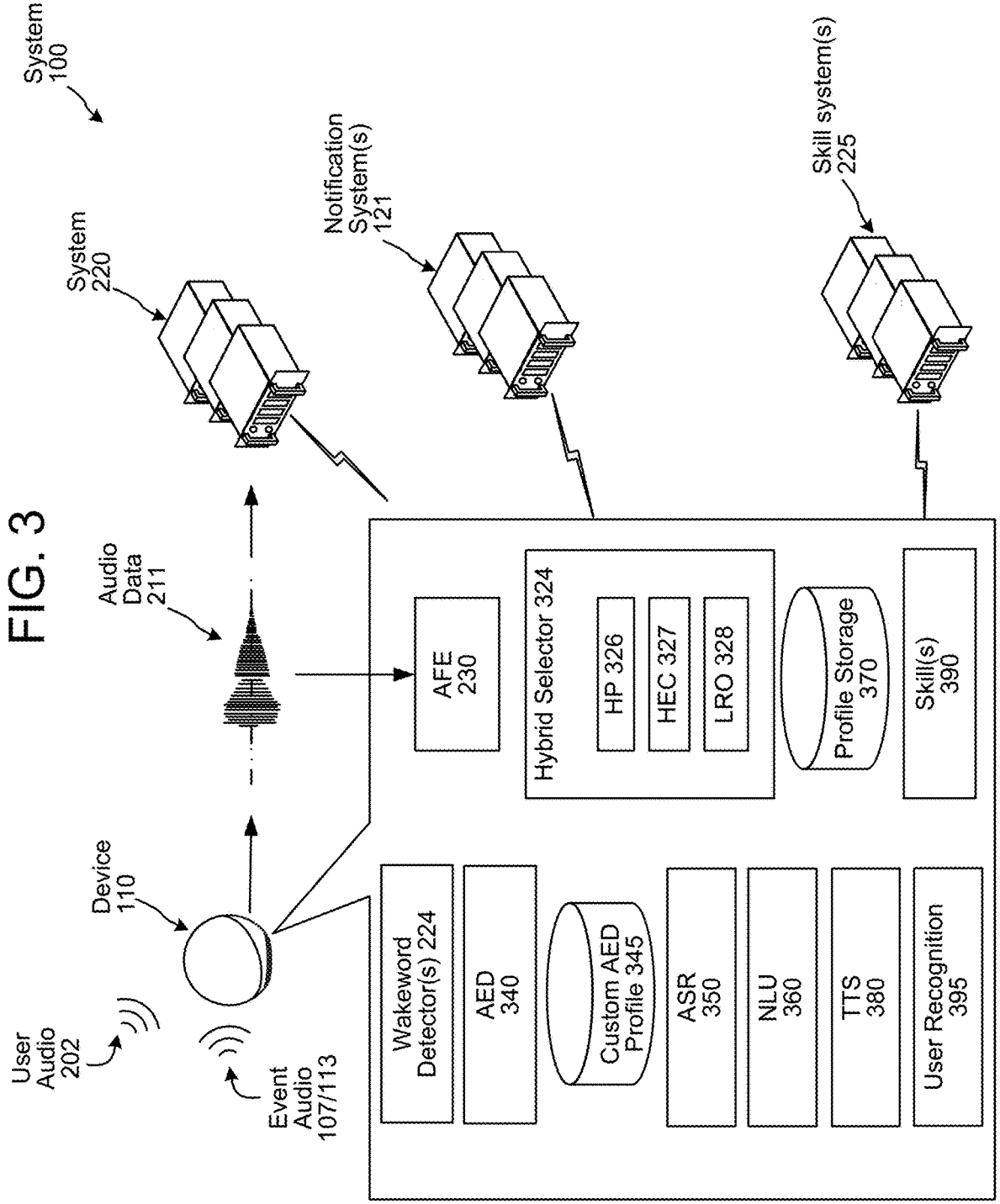
FIG. 3 is a conceptual diagram illustrating components that may be included in a device, according to embodiments of the present disclosure.

The foregoing describes illustrative components and processing of the system(s) 220. The following describes illustrative components and processing of the device 110. As illustrated in FIG. 3, in at least some embodiments the system(s) 220 may receive audio data 211 from the device 110, to recognize speech corresponding to a spoken natural language in the received audio data 211, and to perform functions in response to the recognized speech. In at least some embodiments, these functions involve sending directives (e.g., commands), from the system(s) 220 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system(s) 220 over the network(s) 199, some or all of the functions capable of being performed by the system(s) 220 may be performed by sending one or more directives over the network(s) 199 to the device 110, which, in turn, may process the directive(s) and perform one or more corresponding actions. For example, the system(s) 220, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system(s) 220 may be configured to provide other functions in addition to those discussed herein, such as, without limitation, providing step-by-step directions for navigating from an origin location to a destination location, conducting an electronic commerce transaction on behalf of a user 105 as part of a shopping function, establishing a communication session (e.g., an audio or video call) between the user 105 and another user, and so on.

The AFE components 230 may receive audio data from a microphone or microphone array; this audio data may be a digital representation of an analog audio signal and may be sampled at, for example, 256 kHz. The AED component 160 may instead or in addition receive acoustic feature data 522, which may include one or more LFBE and/or MFCC vectors, from the AFE component 230 as described above. The AFE component 230 for the AED component 160 may differ from the AFE component 230 for the wakeword detector 224 at least because the AED component 160 may require a context window greater in size that that of the wakeword detector 224. For example, the wakeword acoustic-feature data may correspond to one second of audio data, while the AED acoustic-feature data may correspond to ten seconds of audio data.

The wakeword detector(s) 224 may process the audio data 211 as described above, and may be configured to detect a wakeword (e.g., "Alexa") that indicates to the device 110 that the audio data 211 is to be processed for determining NLU output data. In at least some embodiments, a hybrid selector 324, of the device 110, may send the audio data 211 to the wakeword detector(s) 224. If the wakeword detector(s) 224 detects a wakeword in the audio data 211, the wakeword detector(s) 224 may send an indication of such detection to the hybrid selector 324. In response to receiving the indication, the hybrid selector 324 may send the audio data 211 to the system(s) 220 and/or an on-device ASR component 350. The wakeword detector(s) 224 may also send an indication, to the hybrid selector 324, representing a wakeword was not detected. In response to receiving such an indication, the hybrid selector 324 may refrain from sending the audio data 211 to the system(s) 220, and may prevent the on-device ASR component 350 from processing the audio data 211. In this situation, the audio data 211 can be discarded.

The device 110 may conduct its own speech processing using on-device language processing components (such as an on-device SLU component, an on-device ASR component 350, and/or an on-device NLU component 360) similar to the manner discussed above with respect to the speech processing system-implemented ASR component 250, and NLU component 260. The device 110 may also internally include, or otherwise have access to, other components such as one or more skills 390 (configured to process similar to the skills 290), a user recognition component 395 (configured to process in a similar manner to the speech processing system-implemented user recognition component 295), profile storage 370 (configured to store similar profile data to the speech processing system-implemented profile storage 270), a TTS component 380 (configured to process in a similar manner as the TTS component 280) and other components. In at least some embodiments, the on-device profile storage 370 may only store profile data for a user or group of users specifically associated with the device 110. Additionally, the device 110 may include an AED component 340 (configured to process similar to the AED component 160) and a custom AED profile storage 345 (configured to store data similar to the custom AED profile storage 155).

The AED component 340 may receive audio data from a microphone or microphone array; this audio data may be a digital representation of an analog audio signal and may be sampled at, for example, 256 kHz. The AED component 340 may instead or in addition receive acoustic feature data 522, which may include one or more LFBE and/or MFCC vectors, from the AFE component 230 as described above. The AFE component 230 for the AED component 340 may differ from the AFE component 230 for the wakeword detector 224 at least because the AED component 340 may require a context window greater in size that that of the wakeword detector 224. For example, the wakeword acoustic-feature data may correspond to one second of audio data, while the AED acoustic-feature data may correspond to ten seconds of audio data.

In at least some embodiments, the on-device language processing components may not have the same capabilities as the language processing components implemented by the system(s) 220. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system(s) 220. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system(s) 220.

The hybrid selector 324, of the device 110, may include a hybrid proxy (HP) 326 configured to proxy traffic to/from the system(s) 220. For example, the HP 326 may be configured to send messages to/from a hybrid execution controller (HEC) 327 of the hybrid selector 324. For example, command/directive data received from the system(s) 220 can be sent to the HEC 327 using the HP 326. The HP 326 may also be configured to allow the audio data 211 to pass to the system(s) 220 while also receiving (e.g., intercepting) this audio data 211 and sending the audio data 211 to the HEC 327.

In at least some embodiments, the hybrid selector 324 may further include a local request orchestrator (LRO) 328 configured to notify the on-device ASR component 350 about the availability of the audio data 211, and to otherwise initiate the operations of on-device language processing when the audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system(s) 220 and chooses to use that remotely-determined directive data.

Thus, when the audio data 211 is received, the HP 326 may allow the audio data 211 to pass through to the system(s) 220 and the HP 326 may also input the audio data 211 to the on-device ASR component 350 by routing the audio data 211 through the HEC 327 of the hybrid selector 324, whereby the LRO 328 notifies the on-device ASR component 350 of the audio data 211. At this point, the hybrid selector 324 may wait for response data from either or both the system(s) 220 and/or the on-device language processing components. However, the disclosure is not limited thereto, and in some examples the hybrid selector 324 may send the audio data 211 only to the on-device ASR component 350 without departing from the disclosure. For example, the device 110 may process the audio data 211 on-device without sending the audio data 211 to the system(s) 220.

The on-device ASR component 350 is configured to receive the audio data 211 from the hybrid selector 324, and to recognize speech in the audio data 211, and the on-device NLU component 360 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 360) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the system(s) 220, assuming a remote response is even received (e.g., when the device 110 is able to access the system(s) 220 over the network(s) 199), or to determine output data requesting additional information from the user 105.

The device 110 and/or the system(s) 220 may associate a unique identifier with each natural language input. The device 110 may include the unique identifier when sending the audio data 211 to the system(s) 220, and the response data from the system(s) 220 may include the unique identifier to identify to which natural language input the response data corresponds.

In at least some embodiments, the device 110 may include one or more skill components 390. The skill component(s) 390 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 4:
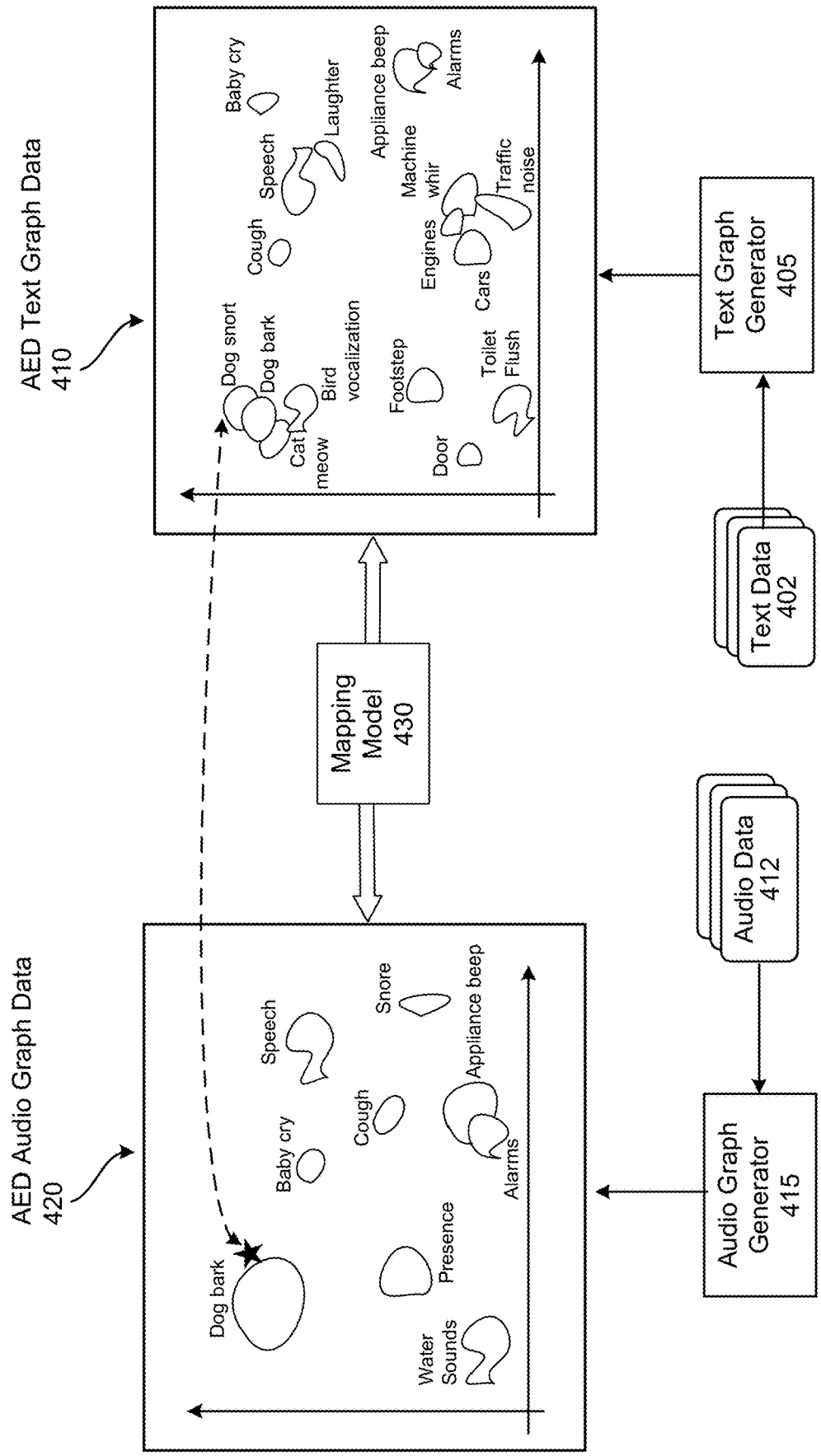
FIG. 4 is a conceptual diagram illustrating audio graph data, text graph data, and how a correspondence between audio and text descriptions are generated, according to embodiments of the present disclosure.

FIG. 4 illustrates how graph data, that may be stored at the AED knowledge storage 145, may be generated. A text graph generator 405 may generate AED text graph data 410 by processing text data 402. The AED text graph data 410 may represent relationships between various natural language descriptions for acoustic events based on the semantic meanings of the natural language descriptions. An audio graph generator 415 may generate AED audio graph data 420 by processing audio data 412. The AED audio graph data 420 may represent relationships between various audio data based on similarities in their corresponding acoustic features. The system 100 may further include a mapping model 430 to generate mappings between the text data represented in the AED text graph data 410 and the audio data represented in the AED audio graph data 420.

As described herein, one graph, AED text graph data 410, may integrate and represent relationships between natural language descriptions, which may be based on text embeddings or word embeddings. The AED text graph data 410 may be generated using text data 402. The text data 402 may be determined from public sources, such as the Internet, and/or more inputs provided by various users. In some embodiments, the text data 402 relates to acoustic events, and may not describe non-acoustic events. For example, the text data 402 may represent "dog barking", "fridge door alarm", "cat meow", etc. In other embodiments, the text data 402 may encompass various descriptions or words, and a text graph generator 405 may process the text data 402 to determine a subset of text data relating to acoustic events only. The text graph generator 405 may use part-of-speech (POS) tagging, named entity recognition (NER), and/or other techniques to determine text data relating to acoustic events. The text data 402 may also refer to token data, sub-words, etc.

In some embodiments, an example set of text relating to acoustic events may be used to determine further text data 402 relating to acoustic events from public sources. For example, starting with the example text "speech", the system may identify a public website that describes "speech", and then use POS tagging and/or NER based methods to extract words/entities related to "speech" from the website. For example, text such as "human vocal communication", "language", "lexicon of a language", "vocalization", etc. may be extracted from the website. The system may use one or more gating mechanisms that select the text that have high semantic similarities with the example text. In this manner, acoustic event-specific text data is extracted from public sources to maximize the richness of the text, evaluated by the text graph generator 405, while not including many irrelevant texts. The text graph generator 405 may use the determined words/entities as new nodes for the AED text graph data 410 when they are determined to be acoustic event relevant. The text corpus, for the AED text graph data 410, may be expanded by following related web pages, NER of existing text data/web pages, etc. as one acoustic event description can lead to discovery of multiple others during the search of relevant text data on the Internet.

Additionally, in some embodiments, user inputs may be used to contribute to the text corpus used to generate the AED text graph data 410. For example, a user may provide natural language descriptions of various different acoustic events through spoken inputs, using a companion application of the AED system(s) 120, etc. Such user inputs may be anonymized and may not be associated with a user identifier, a device identifier, or other identifying information. Additionally, in some embodiments, user inputs provided when configuring the AED system(s) 120 to detect custom acoustic events (e.g., natural language descriptions provided as described above in relation to FIG. 1A) may be used to generate the AED text graph data 410.

The determined AED-specific text corpus (e.g., the text data 402) may be used to fine-tune one or more generic text embedding models such that the structural relationships of different acoustic events are preserved. The fine-tuned text embedding model may then be used to encode the determined text data 402 into semantic representations, which may be vector data with a fixed dimension. The encoded text data may be used to build the vertices of the AED text graph data 410, which may reflect the high-level relationship between different acoustic events. In some embodiments, a vertex between acoustic event A and acoustic event B is determined to be valid by measuring the distance between the vector data/semantic representations of A and B (e.g., Euclidean distance of the two vectors) against a condition (e.g., a dynamic threshold) for similarity measure.

The text graph generator 405 may determine text embeddings for a natural language description for an acoustic event. In some embodiments, a word2vec technique may be used (that generates a 300 dimensional vector representation), and when the natural language description includes multiple words, an average of the vectors for the individual words may be used as the text embedding for the description. In other embodiments, the text graph generator 405 may employ a universal sentence encoder (e.g., that generates a 512 dimensional vector). In yet other embodiments, the text graph generator 405 may employ a tokenizer to identify words that are nouns, verbs or adjectives from the text corpus, and select words with high cosine similarities with respect to the corresponding labels using their vector representations. Then the average of the vector representations of the selected words weighted by their occurrences in the text corpus. This POS tagging-based word selection method makes the text embedding invariant to the order of concatenation of texts from various sources or multiple web pages. The text embeddings may be referred to as word embeddings, in some cases, and may correspond to sub-words, token data, etc.

In some embodiments, the audio data 412 relates to acoustic events and may have natural language descriptions that are included in the text data 402. The mapping model 430 is trained using labeled mappings between a portion of the audio data 412 and a portion of the text data 402. Not all of the descriptions represented in the text data 402 may have corresponding audio data, and not all of the audio data 412 may have a corresponding description. The mapping model 430 may process the AED text graph data 410 and the AED audio graph data 420 to determine bi-linear mappings between text embeddings that do not have a mapping to an audio embedding.

In some embodiments, the audio embeddings may be extracted from log mel spectrogram features of the audio data 412. In some embodiments, the mapping model 430 may use a dense layer (e.g., a 527-unit dense layer) with a sigmoid activation along with an audio encoder may be used to extract audio embeddings corresponding to the audio data 412. The mapping model 430 may be configured using a two-view alignment loss between text embeddings and audio embeddings as a regularizer to the supervised loss. In some embodiments, cosine similarity may be enforced for the multi-view alignment. In other embodiments, linear canonical correlation analysis loss may be used. An example overall loss equation is shown below, where a hyper-parameter $\alpha$ to adjust the relative importance of the supervised cross-entropy loss $L_{sup}$ and the embedding alignment loss $L_{cons}$:

$$L = E_i \left\{ L_{sup}(\hat{y}_i, y_i) + \alpha \frac{1_{r \in Eve(i)} L_{cons}(E_i, Me_i^r)}{\sum_r 1_{r \in Eve(i)}} \right\} \quad (1)$$

$$L_{sup} = y_i^T \cdot \log(\hat{y}_i) + (1 - y_i^T) \cdot \log(1 - \hat{y}_i) \quad (2)$$

$$L_{cons} = \frac{E_i \cdot Me_i^r}{\|E_i\| \cdot \|Me_i^r\|} \quad (3)$$

In equation (1) above, Eve(i) is the set of events present in audio i. The label description is $y_i$, the predicted description is $\hat{y}_i$, the audio embedding is $E_i$ and the text embedding is $e_i$. M is a matrix used to map the text embeddings into the same shape/space as the audio embeddings, which is shared across all the acoustic events. In equation (1) one acoustic event (amongst all events present in the label) is chosen at random (denoted as r in equations (1) and (3)) and use its text embeddings to calculate $L_{cons}$. As the number of epochs becomes sufficiently large, the stochastic implementation approximately converges to equation (1). The supervised loss $L_{sup}$ is updated regularly with all events present in each sample.

After the mapping model 430 is trained, it may be used to process audio data 412 that does not have a bi-linear mapping. At inference time, the mapping model 430 may process first audio data 412 to determine first text data 402 that represents a natural language description of the first audio data 412. The bi-linear mappings between the audio data 412 and the text data 402 may be stored at the AED knowledge graph storage 145. In some embodiments, the bi-linear mappings may be stored as data representing an association/correspondence between an audio embedding and a text embedding.

The stored bi-linear mappings can then be used to determine audio data corresponding to a user-provided natural language description for a custom acoustic event, as described in relation to FIG. 1A. That is, the AED system(s) 120 may determine a natural language description (e.g., as provided by the user 105 or a refined version of the user-provided description), determine a text embedding corresponding to the natural language description, and determine a first node in the AED text graph data 410 that is semantically similar to the text embedding. Using the bi-linear mappings, the AED system(s) 120 may determine a second node in the AED audio graph data 420 that is associated with the first node in the AED text graph data 410, and may use the audio data/audio embedding (e.g., the audio data 147) corresponding to the second node as a potential sample of the custom acoustic event described by the user 105.

When a user-provided natural language description is determined to be a novel node that is not already represented in the AED text graph data 410 (e.g. a user says "Alexa, I want to build a custom sound detector for my puppy dog whimper,"), the system determines an estimated degree of the node to determine how to insert the novel node into the AED text graph data 410. For example, "animal" may be a 'super-category' with the highest degree, "dog sound" and "cat sound" may be its 'sub-categories' that branch into multiple children nodes, and "dog bark" and "cat hiss" may be 'leaf nodes' which do not have children nodes. When a super-category is discovered, then some clusters may be broken up into smaller sub-graphs in order to fit in a new concept. On the other hand, when a leaf node is discovered, it is appended to end of an appropriate branch.

The AED text graph data 410 can be used to provide reference semantics in a "text view" to support various audio tasks when limited or no audio samples are available. For example, concept clusters can be built in both audio and text views. As text data is more readily available (from public sources), the concept clusters may be denser and more accurate in the text view than in the audio view. Using existing audio and text pairs, the mapping model 430 may be trained to determine a bi-linear mapping between the two views. Therefore, when expanding to a new acoustic event, the text representation and the learned bi-linear mapping can be used to estimate its audio representation. For acoustic events that share common "low-level" acoustic features, for example, "cat sound" and "dog sound" are both produced through the same biological pathway (i.e. lung→vocal fold→oral cavity→lips) and their sounds share similar sound production mechanism, the mapping model 430 can generalize well in generating the bi-linear mappings.

In some cases, the AED text graph data 410 can be used for making manual annotations for custom acoustic events more efficient. Because the AED text graph data 410 has a top-down structure, where a sub-graph or cluster embodies the concept of a "super-category" and the leaf nodes represent the more fine-grained description to summarize the target acoustic event, this can be leveraged this to help the manual annotators make faster decisions. With the AED text graph data 410 and the bi-linear map, a few plausible annotation paths can be predicted to assist the annotators to find the best descriptions for acoustic events present in an audio clip. Given a pair of audio embedding and text description, the system can propose top N paths for plausible events based on the likelihoods in a top-down order (super-category→sub-category→leaf node). For example, if an audio contains "dog cry", the system may propose the following few paths:

animal sound→domestic pets→dog sound→dog bark→dog cry→puppy dog cry;

animal sound→domestic pets→dog sound→dog bark→dog whimper→multiple dog whimper→multiple dog whimper and bark;

animal sound→domestic pets→cat sound→cat meow-→cat meow and hiss.

The AED text graph data 410 may be updated based on user inputs provided by multiple users. For example, the AED text graph data 410 may be updated to include natural language descriptions provided by the user 105 that are not already represented in the AED text graph data 410. The AED audio graph data 420 may be updated based on event audio (e.g. the event audio 107, 113) that occurred in multiple user environments. For example, the AED audio graph data 420 may be updated to include audio embeddings that are not already represented in the AED audio graph data 420. The updated AED graph data may be used to process subsequently received user inputs requesting configuration of custom acoustic event detection. For example, a first user may provide a natural language description for a sound made by a particular brand of appliance, and the AED system(s) 120 may capture event audio representing the sound made by the particular brand of appliance. The natural language description and the event audio may be integrated in the respective AED graph data 410, 420, so that when a second user requests detection of the sound made by the particular brand of appliance, the AED system(s) 120 can retrieve audio embedding data corresponding to the previously received event audio, and use the audio embedding data to detect occurrence of the sound made by the particular brand of appliance in the second user's environment.

Figure 5:
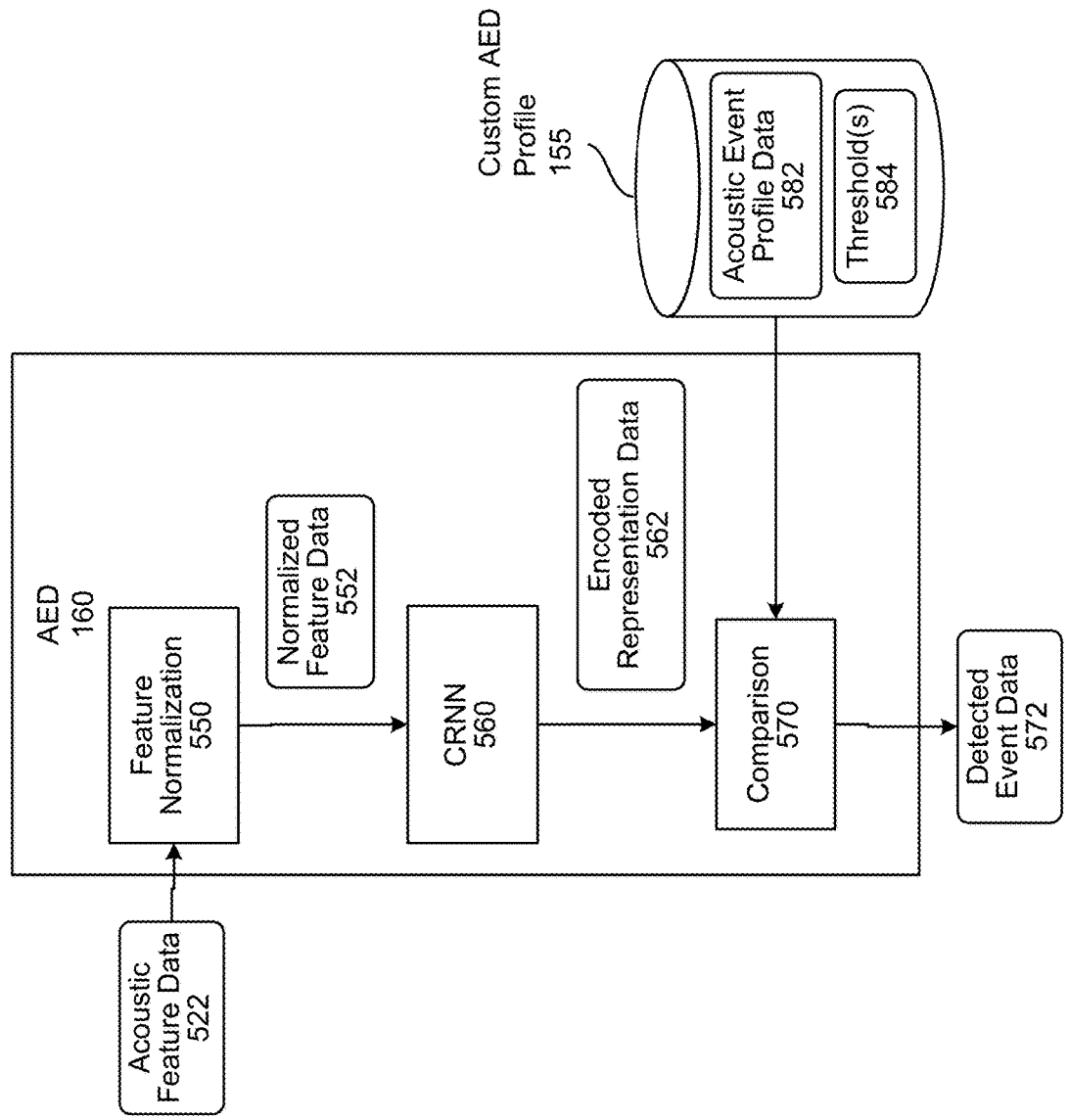
FIG. 5 is a conceptual diagram illustrating components of an acoustic event detection (AED) component, according to embodiments of the present disclosure.

FIG. 5 illustrates components of the AED component 160. As shown, the AED component 160 may include a feature normalization component 550, a CRNN 560, and a comparison component 570. These components may be configured to detect custom acoustic events defined by the user 105 of the devices 110.

The feature normalization component 550 may process the acoustic feature data 522 and may determine normalized feature data 552. The feature normalization component 550 may process the acoustic feature data 522, and may perform some normalization techniques. Different environments (e.g., homes, offices, buildings, etc.) have different background noises and may also generate event audio at different levels, intensities, etc. The feature normalization component 550 may process the acoustic feature data 522 to remove, filter, or otherwise reduce the effect, of any environmental differences that may be captured by the device 110 in the event audio 113, on the processing performed by the CRNN 560 and the comparison component 570. The feature normalization component 550 may use a normalization matrix derived by performing statistical analysis on audio samples corresponding to a wide range of acoustic events.

The CRNN 560 may be an encoder that generates encoded representation data 562 using the normalized feature data 552. The CRNN 560 may include one or more convolutional layers followed by one or more recurrent layer(s) that may process the normalized feature data 552 to determine one or more probabilities that the audio data includes one or more representations of one or more acoustic events. The CRNN 560 may include a number of nodes arranged in one or more layers. Each node may be a computational unit that has one or more weighted input connections, a transfer function that combines the inputs in some way, and an output connection. The CRNN 560 may include one or more recurrent nodes, such as LSTM nodes, or other recurrent nodes, such as gated rectified unit (GRU) noes. For example, the CRNN 560 may include 128 LSTM nodes; each LSTM node may receive one feature vector of the acoustic feature data during each frame. For next frames, the CRNN 560 may receive different sets of 128 feature vectors (which may have one or more feature vectors in common with previously-received sets of feature vectors—e.g., the sets may overlap). The CRNN 560 may periodically reset every, for example, 10 seconds. The CRNN 560 may be reset when a time of running the model (e.g., a span of time spent processing audio data) is greater than a threshold time. Resetting of the CRNN 560 may ensure that the CRNN 560 does not deviate from the state to which it had been trained. Resetting the CRNN 560 may include reading values for nodes of the model—e.g., weights—from a computer memory and writing the values to the recurrent layer(s).

The CRNN 560 may be trained using ML techniques and training data. The training data, for the CRNN 560, may include audio samples of a wide variety of acoustic events (e.g., sounds from different types/brands of appliances, sounds of different types of pets, etc.). The training data may further include annotation data indicating which acoustic events are of interest and which acoustic events are not of interest. The CRNN 560 may be trained by processing the training data, evaluating the accuracy of its response against the annotation data, and updating the recurrent layer(s) via, for example, gradient descent. The CRNN 560 may be deemed trained when it is able to predict occurrence of acoustic events of interest in non-training data within a required accuracy.

The CRNN 560 may be configured to generate encoded representation data that can be used to detect a wider range of acoustic events, so that the CRNN 560 can be used to detect any custom acoustic event taught by the user 105.

The CRNN 560 may thus receive the acoustic-feature data and, based thereon, determine an AED probability, which may be one or more numbers indicating a likelihood that the acoustic-feature data represents the acoustic event. The AED probability may be, for example, a number that ranges from 0.0 to 1.0, wherein 0.0 represents a 0% likelihood that the acoustic-feature data represents the acoustic event, 1.0 represents a 100% likelihood that the acoustic-feature data represents the acoustic event, and numbers between 0.0 and 1.0 represent varying degrees of likelihood that the acoustic-feature data represents the acoustic event. A value of 0.75, for example, may correspond to 75% confidence in the acoustic-feature data including a representation of the acoustic event. The AED probability may further include a confidence value over time and may indicate at which times in the acoustic-feature data that the acoustic event is more or less likely to be represented.

A number of activation function components—one for each acoustic event—may be used to apply an activation function to the probability of occurrence of that event output by the recurrent layer(s). The activation function may transform the probability data such that probabilities near 50% are increased or decreased based on how far away from 50% they lie; probabilities closer to 0% or 100% may be affected less or even not at all. The activation function thus provides a mechanism to transform a broad spectrum of probabilities—which may be evenly distributed between 0% and 100%—into a binary distribution of probabilities, in which most probabilities lie closer to either 0% or 100%, which may aid classification of the probabilities as to either indicating an acoustic event or not indicating an acoustic event by an event classifier. In some embodiments, the activation function is a sigmoid function.

In some embodiments, the CRNN 560 may be configured to convert a higher dimensional feature vector (the normalized feature data 552) to a lower dimensional feature vector (the encoded representation data 562). The CRNN 560 may process multiple frames of acoustic feature data 522, represented in the normalized feature data 552, corresponding to an acoustic event and may ultimately output a single N-dimensional vector that uniquely identifies the event. That is, a first N-dimensional vector is first encoded representation data that represents a first predetermined acoustic event, a second N-dimensional vector is second encoded representation data that represents a second predetermined acoustic event, and so on. The N-dimensional vectors may correspond to points in an N-dimensional space known as an embedding space or feature space; in this space, data points that represent similar-sounding events are disposed closer to each other, while data points that represent different-sounding events are disposed further from each other. The CRNN 560 may be configured by processing training data representing a variety of events; if the CRNN 560 processes two items of audio data from two events known to be different, but maps them to similar points in the embedding space, the CRNN 560 is re-trained so that it maps the training data from the different events to different points in the embedding space. Similarly, if the CRNN 560 processes two items of audio data from two events known to be similar, but maps them to different points in the embedding space, the CRNN 560 is re-trained so that it maps the training data from the similar events to similar points in the embedding space.

The comparison component 570 may be configured to process the encoded representation data 562 with respect to one or more acoustic event profile data 582 using a corresponding threshold 584. As described herein, the custom AED profile storage 155 may store the acoustic event profile data 582 and the corresponding threshold 584 based on the user 105 configuring the AED system(s) 120 to identify a custom acoustic event. Each of the acoustic event profile data 582 may be acoustic feature data corresponding to a single individual custom acoustic event. For example, first acoustic event profile data 582a may correspond to a custom doorbell sound, second acoustic event profile data 582b may correspond to a particular breed dog bark, etc. Each of the thresholds 584 may be a threshold value of similarity, and may correspond to a single individual custom acoustic event. For example, a first threshold 584a may be a first threshold value corresponding to the first acoustic event profile data 582a, a second threshold 584b may be a second threshold value corresponding to the second acoustic event profile data 582b, etc.

The comparison component 570 may process the encoded representation data 562 with respect to each of the acoustic event profile data 582, and may determine how similar the encoded representation data 562 is to the acoustic event profile data 582. The comparison component 570 may determine such similarity using various techniques, for example, using a cosine similarity, using a number of overlapping data points within a feature space, using a distance between data points within a feature space, etc. The comparison component 570 may determine that the encoded representation data 562 corresponds to the custom acoustic event represented in the acoustic event profile data 582 when the similarity satisfies the corresponding threshold 584. The similarity may be represented as one or more numerical values or a vector of values, and the threshold 584 may be represented as single numerical value. In some embodiments, the average of the similarity values may exceed/satisfy the threshold 584 for the comparison component 570 to determine that the corresponding custom acoustic event occurred. As described herein, the encoded representation data 562 is a vector and the acoustic event profile data 582 is a vector, and in some embodiments, if each of the values of the encoded representation data 562 (e.g., each of the values of the N-vector) are within the threshold 584 of each of the corresponding values of the acoustic event profile data 582, the comparison component 570 may determine that the corresponding custom acoustic event occurred.

The comparison component 570 may evaluate the encoded representation data 562 with respect to each of the acoustic event profile data 582, and may determine, in some cases, that more than one custom acoustic event is represented in the event audio 113. For example, the comparison component 570 may process the encoded representation data 562 with respect to the first acoustic event profile data 582a to determine first similarity data that satisfies the first threshold 584a, and may process (in parallel) the encoded representation data 562 with respect to the second acoustic event profile data 582b to determine second similarity data that satisfies the second threshold 584b, and may then determine, based on both of the first and second thresholds 584 being satisfied, that the first and second custom acoustic events occurred.

The AED component 160 may output detected event data 572 representing one or more custom acoustic events occurred based on processing the event audio 113. The detected event data 572 may be an indication (e.g., a label, an event identifier, etc.) of the custom acoustic event represented in the event audio 113. For example, the detected event data 572 may be data indicating that a dog barking event occurred. In some cases, the event audio 113 may represent more than one event occurrence, and the detected event data 572 may indicate that more than one of the custom acoustic events occurred. For example, the detected event data 572 may be data indicating that a dog barking event and a fridge door alarm event occurred. If the event audio 113 does not correspond to any of the custom acoustic events, then the detected event data 572 may be null, may indicate "other" or the like.

In some embodiments, the detected event data 572 may correspond to a portion of the event audio 113, for example, a set of audio frames that are processed by the AED component 160. The AED system(s) 120 may include an event detection component that may aggregate the results (e.g., detected event data) of the AED component 160 processing sets of audio frames of the event audio data 162 corresponding to the event audio 113. The event detection component may perform further processing on the aggregated results/detected event data to determine an acoustic event represented in the event audio 113. Such further processing may involve normalizing, smoothing, and/or filtering of the results/detected event data.

In some embodiments, the AED component 160 may determine the detected event data 572 in a number of different ways. If multiple samples of the custom acoustic event is used/stored in the acoustic event profile data 582, the AED component 160 may encode each sample to a different point in the embedding space. The different points may define an N-dimensional shape; the comparison component 570 may deem that the encoded representation data 562 defines a point within the shape, or within a threshold distance of a surface of the shape, and thus, indicates occurrence of the corresponding custom acoustic event. In other embodiments, the AED component 160 may determine a single point that represents the various points determined from the various samples of the custom acoustic event. For example, the single point may represent the average of each of the values corresponding to the samples. The single point may further represent the center of the shape defined by the points.

The comparison component 570 may output the detected event data 572 indicating which, if any, of the custom acoustic events (indicated in the custom AED profile storage 155) occurred based on processing of the event audio 113. The detected event data 572 may include one or more labels or indicators (e.g., Boolean values such as 0/1, yes/no, true/false, etc.) indicating whether and which of the custom acoustic events occurred. In some embodiments, each of the acoustic event profile data 582 may be associated with an event identifier (e.g., a numerical identifier or a text identifier), and the detected event data 572 may include the event identifier along with the label/indicator.

The AED component 160 may output an indication of detection of a custom acoustic event as the detected event data 572. Such detected event data 572 may include an identifier of the custom acoustic event, a score corresponding to the likelihood of the custom acoustic event occurring, or other related data. Such detected event data 572 may then be sent, over the network(s) 199, to a downstream component, for example notification system(s) 121/event notification component 228 or another device.

Figure 6:
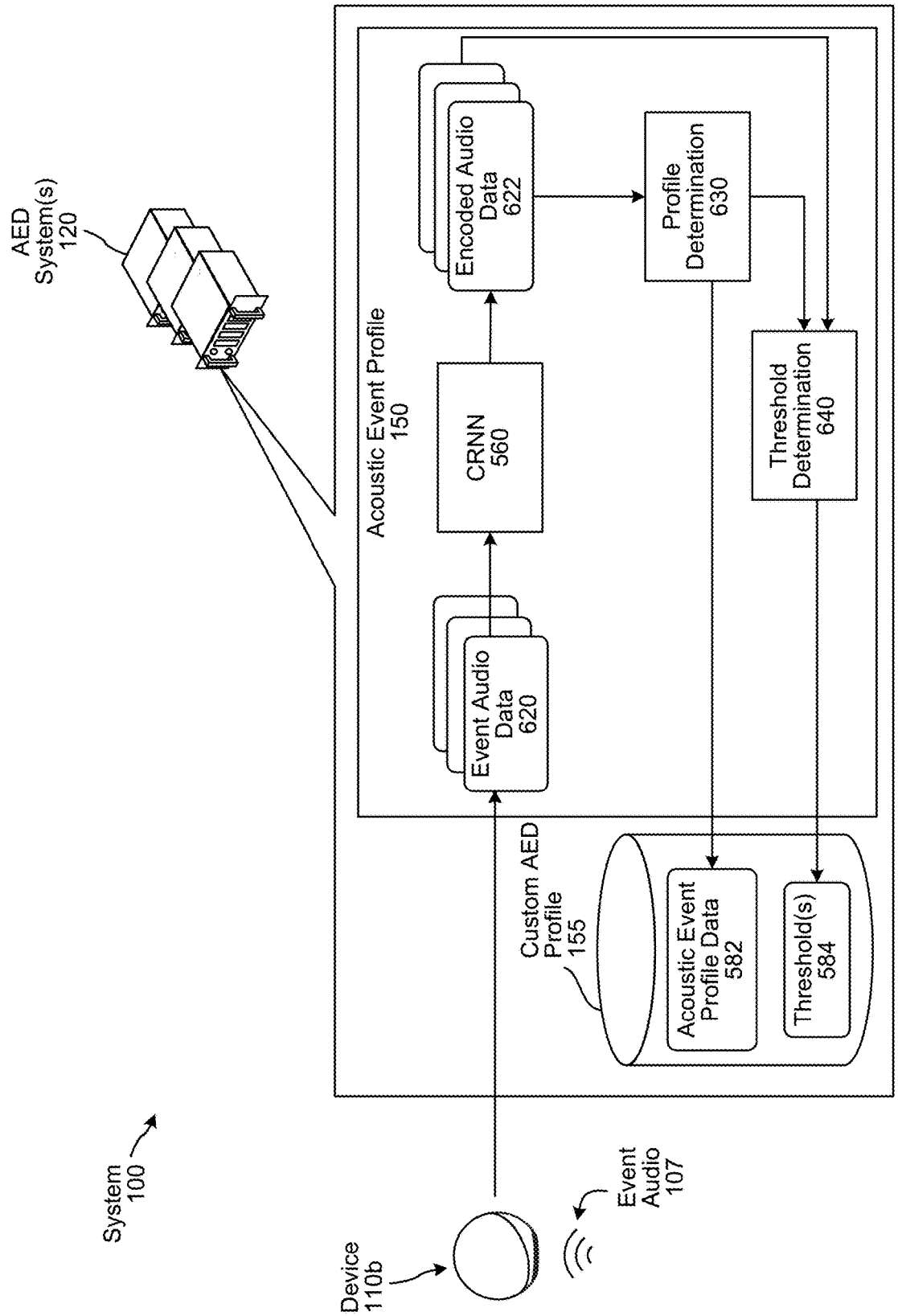
FIG. 6 is a conceptual diagram illustrating a system for generating an acoustic event profile data for a custom acoustic event, according to embodiments of the present disclosure.

FIG. 6 illustrates the system 100 for generating the acoustic event profile data 582 for a custom acoustic event. In some cases, the system 100 may configure the AED component 160 to detect a sound selected by the user 105 of the device 110. The user 105 may interact with the device 110a using the speech-processing techniques described herein and command the device 110 to learn a new sound with a spoken input such as, "Alexa, I want to you learn a new sound." The device 110a and/or system(s) 220 may determine the intent of the user 105 by processing corresponding audio data with the ASR and/or NLU techniques described herein. The device 110a and/or system(s) 220 may identify the AED system(s) 120 as the system to respond to the spoken input. The AED system(s) 120 may cause the device 110a (and/or another device) to output a prompt asking the user 105 to provide a description of the sound that the user wants detected. The AED system(s) 120 may further prompt the user 105 to confirm further or other natural language descriptions corresponding to the sound (as described above in relation to FIG. 1A). After determining audio data corresponding to the natural language description of the custom sound, the AED system(s) 120 may determine and send event audio data representing occurrence of the custom sound to determine the acoustic event profile data.

The device 110b may receive event audio 107 representing occurrence of the custom sound. As described above in relation to FIG. 1B, the AED system(s) 120 may determine whether the event audio 107 is a sample of the custom sound, and may send a prompt to the device 110a asking the user 105 to confirm that the event audio 107 represents occurrence of the custom sound. If the user's environment includes multiple devices 110, each one may receive the event audio 107 representing occurrence of the event. Each instance of the event audio 107 from each device 110 may be evaluated to determine a quality value, and the device 110 having the highest quality value may be selected for further processing. The quality metric may be, for example, a signal-to-noise ratio (SNR) of the audio, a loudness of a sound represented in the audio, or other such quality value. The audio may also be evaluated (by the device or the system) to determine a value corresponding to the sufficiency of the audio to provide reference data for the AED component 160 (e.g., a value representing how good the audio sample will be for training purposes. The value may be based at least in part on various factors such as signal quality, signal length, the appearance of background interfering noise (e.g., speech, unwanted overlapping sound, etc.), number of iterations of the audio data, or the like.

The device 110*b* may process the event audio 107 using an AFE component (e.g., the AFE component 230 described herein) to determine event audio data 620. In such embodiments, the event audio data 620 may be acoustic features, such as, a frequency-domain representation of the event audio 107, LBFE values corresponding to the event audio 107, MFCCs corresponding to the event audio 107, etc. In other embodiments, the event audio data 620 may be the audio data generated by the microphone(s) 820 of the device 110*b*.

The acoustic event profile component 150 of the AED system(s) 120 may process the event audio data 620 using the CRNN 560. The CRNN 560 may already be trained using samples representing a wide range of acoustic events, and may be configured as an encoder for audio data corresponding to a variety of acoustic events. The CRNN 560 may output encoded audio data 622, which is a vector of values, corresponding to the event audio data 620. The encoded audio data 622 may be processed by a profile determination component 630 to determine the acoustic event profile data 582.

The profile determination component 630 may be configured to determine whether additional samples of the custom acoustic event are needed based on the encoded audio data 622 received so far. In some embodiments, the acoustic event profile component 150 may require a predetermined number of samples of the custom acoustic event to be detected. Such predetermined number of samples may need to satisfy certain conditions, such as, audio quality, SNR, intensity, etc. Based on evaluating the received encoded audio data 622, the acoustic event profile component 150 may cause the AED system(s) 120 to collect additional event audio 107 representing a potential sample of the custom acoustic event. When enough audio data is gathered, the acoustic event profile component 150 may determine the acoustic event profile data 582 and the threshold 584 for the instant custom acoustic event.

One or more of the points defined by processing the encoded audio data 622 corresponding to the occurrences of the custom acoustic event may be discarded by the profile determination component 630. For example, if two or more points are determined to be relatively near each other in the embedding space, but one or more points are determined to be relatively far away from the two or more relatively near points, the relatively far-away point(s) may not be used when determining the vector data for the acoustic event profile data 582 (e.g., when determining the shape, the center, or the average of the points). For example, the device 110 may collect event audio for three occurrences of the custom acoustic event, but audio data corresponding to one of the occurrences may include noise (e.g., a car horn honked while the doorbell was ringing). This noisy audio data may be identified by its distance, from the other points, in the embedding space, and therefore discarded.

In other embodiments, if there are at least three items of audio data that represent at least three occurrences of the acoustic event, the acoustic event profile component 150 may determine the shape, average, and/or center of the corresponding points in the embedding space using only two (or other subset) of the points determined from the encoded audio data 622 and then test the result using the third (or other additional) item of audio data. If processing the third item of audio data results in a point corresponding to the shape, average, and/or center determined from the first two items of audio data, the acoustic event profile component 150 may deem that the shape, average, and/or center accurately estimates the occurrence of the custom acoustic event and may be used to generate the acoustic event profile data 582. The acoustic event profile component 150 may further define the shape, average, and/or center using other combinations of subsets of the audio data and test the shape, average, and/or center with other items of audio data. If, for example, a certain combination of items of audio data results in a shape, average, and/or center that fails to process additional items of audio data to determine that those items correspond to the occurrence of the audio event, those combinations and/or items of audio data common to those combinations may be discarded, and the shape, average, and/or center may be determined using remaining instances of the encoded audio data 622.

The event audio data 620 may represent other audio beyond the event audio 107. In certain situations the AED system(s) 120 may be configured to remove the extraneous audio prior to determining the encoded audio data 622 to be used for generating the acoustic event profile data 582. For example, if the system detects speech in the event audio data 620 (for example using a VAD/VAD techniques or other techniques disclosed herein) the AED system(s) 120 may remove the portion of the audio data representing the speech, and may only proceed using the event audio data 620 with the speech portion removed.

The profile determination component 630 may determine the acoustic event profile data 582 to be a vector of values determined from processing the encoded audio data 622 corresponding to two or more samples of the event audio 107 for the custom acoustic event. As described above, the profile determination component 630 may evaluate the data points for each sample, determine a shape, a cluster, and/or an average of the data points, and the data points determined to fit the shape/cluster may be included in the acoustic event profile data 582. In other cases, the average of the data points may be included in the acoustic event profile data 582. The vector in the acoustic event profile data 582 may include values in a sequence/order corresponding to time, so that the acoustic event profile data 582 represents how the custom acoustic event is to sound over a duration of time. For example, a particular type of microwave may beep with increasing intensity over a period of 15 seconds, and the acoustic event profile data 582 may represent this information via the sequence/order of values in the vector.

The threshold determination component 640 may determine the threshold 584 for the instant custom acoustic event. In some embodiments, the threshold determination component 640 may process the acoustic event profile data 582 (generated by the profile determination component 630) and/or the encoded audio data 622 corresponding to two or more samples of the custom acoustic event. In some embodiments, the threshold determination component 640 may determine metrics corresponding to the encoded audio data 622. Such metrics may relate to false acceptance rate (FAR), false rejection rate (FRR), etc., and may be used to determine the threshold 584 for the instant custom acoustic event. The FAR and FRR metrics may be determined based on which data points fall outside of the shape/cluster used to determine the acoustic event profile data 582. The threshold determination component 640 may further perform aggregated estimation techniques using random/negative samples (samples other than the instant custom acoustic event samples), may augment the positive samples of the instant custom acoustic event, and may compare the random/negative samples and the positive samples using statistical analysis to determine the metrics and the threshold 584. The determined acoustic event profile data 582 and the corresponding threshold 584 may be stored in the custom AED profile storage 155.

In some embodiments, the CRNN 560 may be fine-tuned/retrained using event audio data 620 corresponding to one or more custom acoustic events taught by the user 105. In such cases, the CRNN 560 may be customized/fine-tuned for the user 105/the device 110. Such fine-tuning may enable the CRNN 560 to detect custom acoustic events for the user 105 more accurately than another CRNN that may be configured to for another user/set of custom acoustic events. For fine-tuning, training data may include multiple instances of event audio data 620, and the trained CRNN may be tested against the acoustic event profile data 582, for the custom acoustic events represented in the training data, to determine accuracy of the trained CRNN. In such embodiments, the fined-tuned/retrained CRNN 560 may be included in the AED component 340 for the device 110.

In some embodiments, the CRNN 560 may be updated/retrained and/or the custom AED profile storage 155 may be updated based on feedback received from the user 105 when the device 110 detects custom acoustic events (as described in relation to FIG. 1C). The device 110 (or another device) may output a notification of a custom acoustic event being detected, however, the user 105 may provide feedback (e.g., via a spoken input, touch input, gesture, etc.) that the custom acoustic event did not in fact occur, the notification is incorrect, the user did not want to be notified of this event, etc. Using such feedback, the AED system(s) 120 may update the CRNN 560, the acoustic event profile data 582, and/or the threshold 584.

In some embodiments, the CRNN 560 may be updated/retrained and/or the custom AED profile storage 155 may be updated based on type of acoustic event or type of the source of the acoustic event. Some acoustic event sources may be dynamic and may change over time, while other acoustic event sources may be static and may not change. For example, a bark by a puppy is likely to have a different bark than the same dog as an adult. Based on the expected changes in the acoustic event source, the AED system(s) 120 may prompt the user or initiate retraining and/or updating of data. For example, for natural language description "puppy bark" for an acoustic event, the AED system(s) 120 may prompt retraining/updating at a time in the future (e.g., every 4 weeks for the next couple of months) to update at least the acoustic event profile data 582, so that a bark by the same dog is detected by the AED system(s) 120 while the dog grows. The AED system(s) 120 may prompt retraining on a periodic basis for a time period or until the event audio, captured in the user's environment, does not change significantly for a given time period (e.g., the dog has reached an adult age).

In some embodiments, the user 105 may wish to configure the device 110 to perform one or more "if-then" determinations based on two or more custom acoustic events. For example, the user 105 may not wish to be notified every time the device 110 detects that a microwave beeps; instead, the user may wish that the device 110 determines that, upon detection of the microwave beeping, it will send data to a second user device notifying the user 105 of the beeping only if it does not detect the sound of the door of the microwave opening and/or closing within a period of time after detection of the beeping (e.g., five minutes). The user 105 may speak an utterance specifying this condition and/or the AED system(s) 120 may determine that such a condition is likely (e.g., determining that the first acoustic event corresponds to a timer expiring and cause output, by the device 110, of a prompt requesting the user 105 to cause occurrence of the second custom acoustic event (upon which the first custom acoustic event is dependent/conditioned on).

Figure 7:
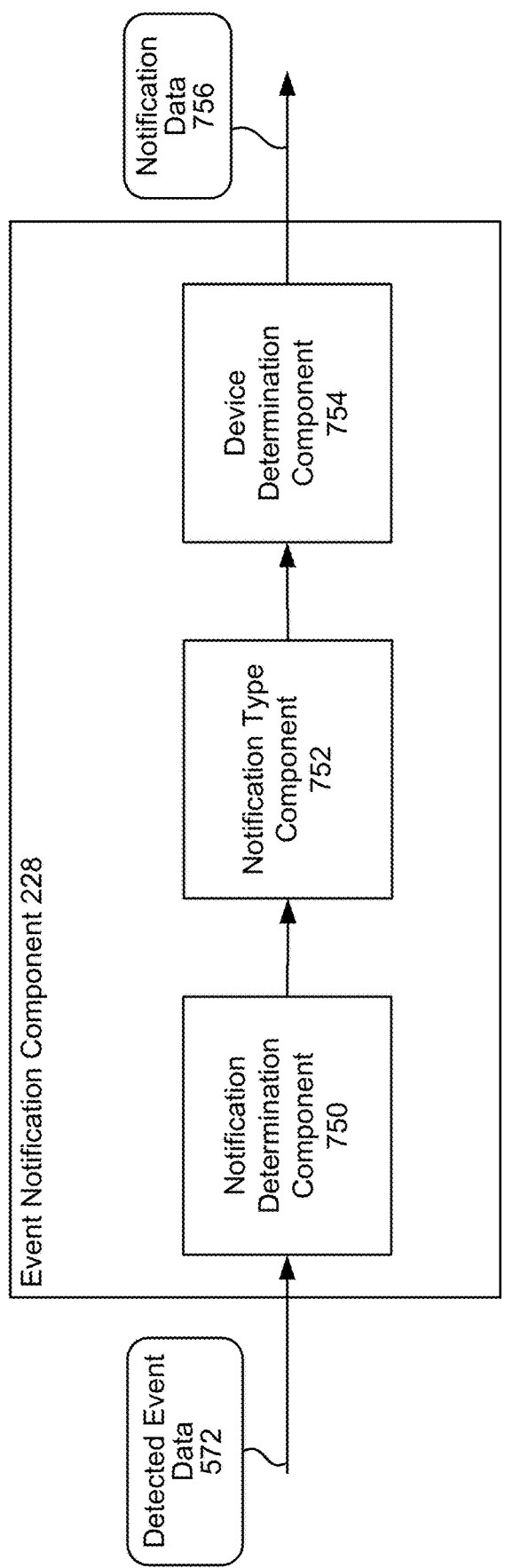
FIG. 7 illustrates an event-notification component according to embodiments of the present disclosure.

FIG. 7 illustrates example components of the notification system(s) 121. As shown in FIG. 7, the event notification component 228 may include a notification determination component 750, a notification type component 752, and/or a device determination component 754. The notification-determination component 750 may receive one or more of the detected event data 572 and determine if a notification corresponding to the event(s) should be sent to one or more device(s). The detected event data 572 may, for example, indicate a first kind of event, such as glass breaking or a baby crying, and the notification-determination component 750 may determine that a corresponding notification should be sent to a user device. The detected event data 572 may, on the other hand, indicate a second kind of event, such as a dog bark, and the notification-determination component 750 may determine that no notification may be sent. The notification-determination component 750 may make this determination by determining data identifying the event and determining a corresponding user preference (as stored in, for example, the profile storage 270/370) for receiving notifications corresponding to the event. That is, a user of the device 110 may have input a preference for receiving a notification corresponding to a particular event, and the notification-determination component 750 may determine to send a notification based on the preference. In some embodiments, the notification-determination component 750 determines whether or not to send a notification based at least in part on the type of the event. For example, if the event corresponds to a potentially dangerous or rare event, such as glass breaking, the notification-determination component 750 may determine to send the notification.

The notification-type component 752 may determine the type of the notification to be sent. Types of notifications may include text messages, emails, phone calls, push notifications, or other such notifications. Like the notification-determination component 750, the notification-type component 752 may determine the type of the notification based on a user preference stored in the profile storage 270/370. The notification-type component 752 may similarly determine the type of the notification based on the type of the event, wherein potentially dangerous or rare events may correspond to a first type of notification, such as a phone call, while other types of events may correspond to a second type of notification, such as an email.

A device-determination component 754 may determine which of a potential plurality of user devices should receive the notification(s). In some embodiments, the device-determination component 754 may determine that the notification(s) (e.g., notification data 756) are to be sent to every device associated with a user account stored in the profile storage 270/370. In other embodiments, the device-determination component 754 determines that the notification(s) are to be send to a subset of the devices. For example, for one event (e.g., a high priority event) a user may indicate that every device associated with the user profile be notified if the event is detected. In another example, for a different event (e.g., a low priority event) a user may indicate that only a single specific device associated with the user profile be notified if the event is detected. In another example, a user may indicate that another device outside the user profile be notified if an event is detected (e.g., if a toilet running is detected send a notification to a device/telephone number associated with a plumber).

The system 100 may be used to create various acoustic event detection data for different events as detectable by different devices in different locations. For example, for a same acoustic event, the system may prompt the user to walk through audio capture by several different devices (for example one device in the living room, one device in the kitchen, etc.). The system 100 may instruct the user to cause the event and may capture acoustic data from multiple different devices while the event occurs. The system 100 may use this combined information to form one set of AED configuration data that may be used by multiple devices (e.g., jointly trained AED data goes to each device). Alternatively (or in addition) the system 100 may use the audio data from each device to train different AED configuration data for the different devices. For example, the audio data captured by the kitchen device may be used to train AED configuration data to be used by the kitchen device and audio data captured by a living room device may be used to train AED configuration data to be used by the living room device, thus resulting in two different trained AED models even though they are trained to detect the same acoustic event, albeit from different locations (and potentially different devices).

The system 100 may also be used to create various acoustic event detection data for the same as detectable by a same device, though if the event occurs in a different location relative to the detecting device. For example, to a device in a kitchen an electronic toy left on may sound different when the toy is in the living room as opposed the toy being in the dining room (depending, of course, on home acoustics, properties of the sound, properties of the detecting device, etc.). In such a situation the system may create one set of AED configuration data (e.g., trained AED model) for the acoustic event from a first location and another set of AED configuration data (e.g., trained AED model) for the acoustic event from a second location different from the first location. To do so the system may need to go through the training/prompting steps for each location and then may capture respective audio data corresponding to the respective location in order to train the separate AED model(s). The AED model(s) may then be loaded onto a device 110 which, when it attempts to detect a future event, may operate both AED model(s). Thus if a particular model is used to detect the event, the device 110 may also be able to output an indication of a location of a source of the event based on which AED model was used to recognize the event. For example, if an AED model corresponding to an acoustic event originating in location A (e.g., the living) results in a higher confidence than an AED model corresponding to the same acoustic event originating in location B (e.g., the dining room), the device 110 may output an indication that the event was detected in location A.

In certain configurations, if the user replaces a device 110*a* at a particular location, the user may indicate to the system that the new device 110*b* will be located at the same location. The system may then send the appropriate AED configuration data (e.g., AED model(s)) to the new device 110*b* so the new device 110*b* can be configured to recognize the same custom acoustic events as the prior/replaced device 110*a*.

A physical location (e.g., a primary residence, a vacation home, a rental property, a hotel, an office, or other physical space, etc.) may include a variety of smart home devices. As used herein, a "smart home device" refers to a computing device that is capable of being controlled using speech, among other things. Example smart home devices include, but are not limited to, light switches, light bulbs, plugs, thermostats, door locks, microwaves, toasters, ovens, coffee makers, faucets, dishwashers, laundry machines (washers and dryers), televisions, and speakers. One or more of the devices 110, associated with the user profile of the user 105, may be a smart home device.

Figure 8:
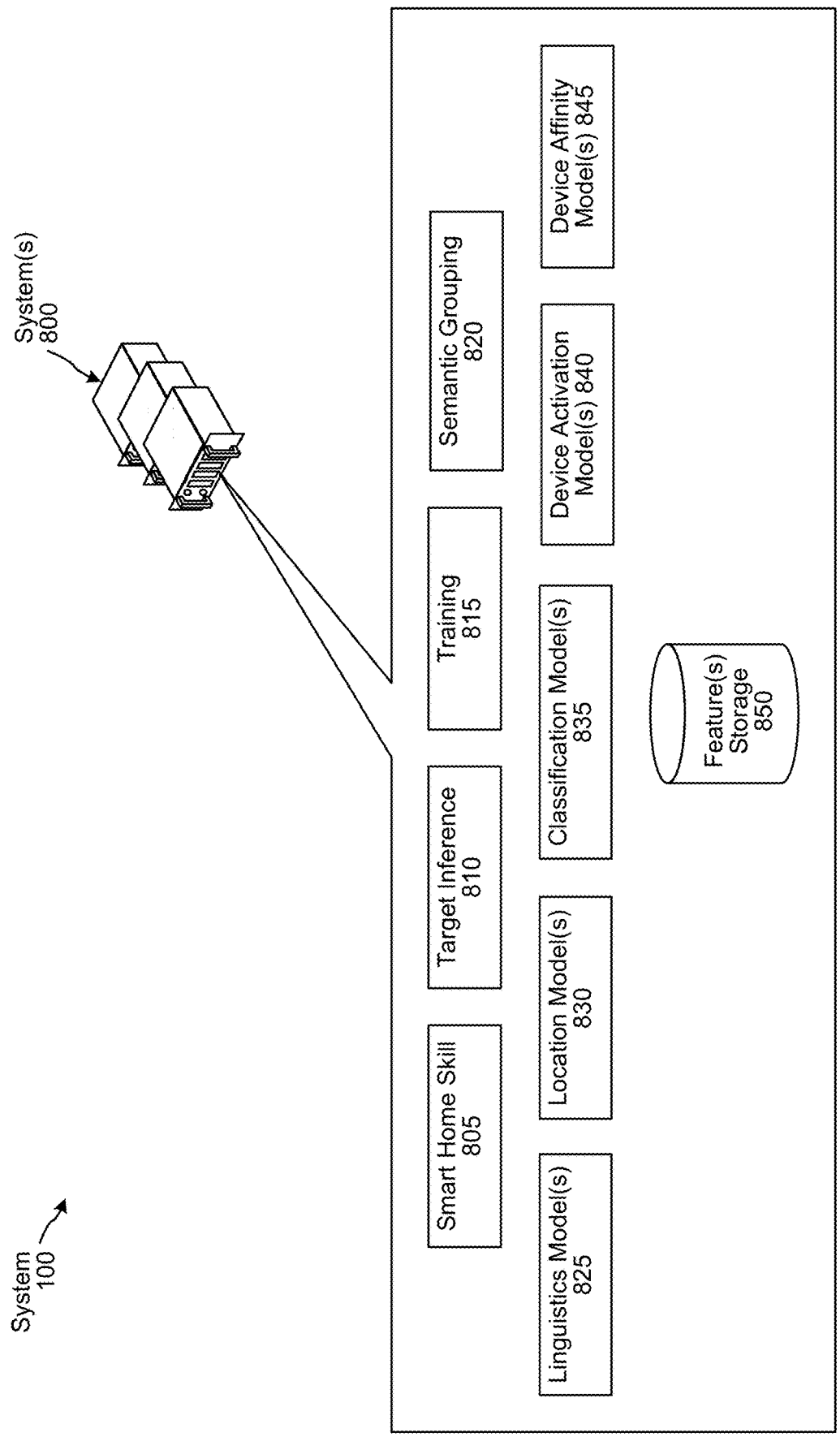
FIG. 8 is a conceptual diagram of components of a system for processing user inputs relating to smart home devices, according to embodiments of the present disclosure.

FIG. 8 is a conceptual diagram of components of a system(s) 800 for processing user inputs relating to smart home devices. For example, the user 105 may provide a spoken input relating to a smart home device, the system(s) 220 may process the spoken input, and the system(s) 220 may send data relating to the spoken input to the system(s) 800 for further processing. The system(s) 800 may process with respect to the spoken input (as described below) and may cause a smart home device 110 to operate accordingly.

The system(s) 800 may also be used to control smart home devices in response to occurrence of certain acoustic events. For example, the AED system(s) 120 may receive event audio from the device 110*b*, may determine that the event audio represents footsteps, and may send, to the system(s) 800, data indicating that event audio representing footsteps is detected by the device 110*b*. In response to receiving the data from the AED system(s) 120, the system(s) 800 may cause a smart light 110*c* to turn on, where the smart light 110*c* may be located near/proximate to the device 110*b*. As another example, in response to receiving the data, from the AED system(s) 120, indicating footsteps are detected, the system(s) 800 may cause a security alarm device 110*d* to generate an alert, when the security alarm device 110*d* is in an "armed" mode.

The system(s) 800 may include a smart home skill 805, a target inference component 810, a training component 815, a semantic grouping component 820, one or more linguistics models 825, one or more location models 830, one or more classification models 835, one or more device activation models 840, one or more device affinity models 845, and a feature(s) storage 850.

The smart home skill 805 may be one of the skill components 290/390 and may be configured to receive NLU output data and attempt to determine which device 110 is to be controlled. In some instances, the smart home skill 805 may determine more than one device 110 may correspond to a device to be controlled. In such an example, the smart home skill 805 may call or otherwise request the target inference component 810 perform target device resolution.

The target inference component 810 may use data stored in the profile storage 270/370 and/or from audio data representing the spoken input along with one or more models to determine which device 110 should be acted upon. For example, the target inference component 810 may receive data from one or more sources as input into a classification model(s) 835 for determining which device 110 should be acted upon in light of device identifying information in the spoken natural language input. The data may include, for example, names of the devices 110 associated with the device that received the spoken input, device-state data indicating historical activation and deactivation of the devices 110, prior-request data indicating which devices 110 were activated and/or deactivated recently, device affinity data indicating frequencies at which devices 110 are controlled by speech controllable devices, current device state data indicating the state of devices 110 at or near the time the spoken natural language input was received, and/or the audio data representing the spoken natural language input.

The one or more models may be configured to use some or all of this data to generate features for input into the classification model(s) 835. For example, the linguistics model(s) 825 may use the device identifying information from the spoken input and the names of the devices 110 to determine semantic similarities for some or all device identifying information/name pairs. The features generated by the linguistics model(s) 825 may include semantic-similarity scores for some or all of the pairs, with the most favorable score being associated with the device name that was determined by the linguistic model(s) 825 to be most semantically similar to the device identifying information from the spoken natural language input. For example, the linguistics model(s) 825 may determine "study light" to have a more favorable similarity score with respect to "office light" than "kitchen light" because "study" and "office" are more semantically similar than "study" and "kitchen." These features may be configured to be input include the classification model(s) 835 and/or may be stored in the feature(s) storage 850 for use by the classification model(s) 835.

As to the linguistics model(s) 825, machine learning techniques may be used to generate models that extract and/or use extracted names associated with the devices 110 and calculate semantic similarities between the names and the device identifying information from the spoken natural language input. A device pair may be identified, determined, and/or generated for each pair of device identifying information and device 110. For example, a first pair may correspond to a first device 110*a* and the device identifying information, a second pair may correspond to a second device 110*b* and the device identifying information, a third pair may correspond to a third device 110*c* and the device identifying information, etc. The names associated with the devices 110 may be analyzed with respect to the device identifying information, using the linguistics model(s) 825, to determine a probability score for each pair.

In addition to, or instead of, using the linguistics model(s) 825, the system(s) 800 may use the device activation model(s) 840 to perform target device resolution. By way of example, the device activation model(s) 840 may use the device-state data and/or the spoken natural language input data to determine probabilities that the devices 110 are operated at the time when the spoken natural language input is received. A probability may be determined for some or all of the devices 110 associated with the speech controllable device that received the spoken input. The features generated by the device activation model(s) 840 may include device activation scores for some or all of the devices 110, with the most favorable score being associated with the device 110 that is most frequently operated during the time and/or within a time range that includes the time at which the spoken input was received.

For example, it may be determined that at or near a certain time of the day and/or day of the week, such as weekdays at 2:00 pm for example, a first device 110*a* with the name "office light" is activated frequently. If a spoken input is received by the system(s) 220 at, for example, 2:04 pm, the device activation model(s) 840 may determine that a higher probability exists that the "office light" device is the device to be acted upon rather than, for example, a "bedroom light" device, which is operated less frequently at or around 2:00 μm. These features may be configured to be input include the classification model(s) 835 and/or may be stored in the feature(s) storage 850 for use by the classification model(s) 835.

As to the device activation model(s) 840, rules-based and/or machine learning techniques may be used to generate models that extract and/or use timing information associated with when a device 110 is turned on and/or turned off. The device activation model(s) 840 may be configured to receive timing data. The timing data may be used to determine when devices 110 are turned on and/or turned off. A threshold degree of usage similarity may be identified and/or determined and may be used to analyze whether a given device has a usage frequency that meets or exceeds the threshold degree of usage similarity.

In addition to, or instead of, using the linguistics model(s) 825 and/or the device activation model(s) 840, the system(s) 800 may use the device affinity model(s) 845 to perform target device resolution. By way of example, the device affinity model(s) 845 may use device affinity data to determine frequencies at which devices 110 are operated by speech controllable devices. For example, some devices 110 may be operated more frequently by one speech controllable device over another speech controllable device, such as devices 110 in an office being operated more frequently by a speech controllable device situated in the office. A frequency and/or score indicating how frequent some or all of the devices 110 are used by some or all of the speech controllable devices 110 may be determined by the device affinity model(s) 845. The features generated by the device affinity model(s) 845 may include device affinity scores, with the most favorable score being associated with the device 110 that is most frequently operated by the speech controllable device from which the spoken natural language input was received. These features may be configured to be input into the classification model(s) 835 and/or may be stored in the feature(s) storage 850 for use by the classification model(s) 835.

As to the device affinity model(s) 845, rules-based and/or machine learning techniques may be used to generate models that extract and/or use device affinity information associated with a frequency at which a device 110 is caused to operate by given speech controllable devices. For example, a physical location may include two or more speech controllable devices, for example one in an office and one in a bedroom. The office speech controllable device may be frequently used to operate certain devices 110, whereas the bedroom speech controllable device may be frequently used to operate other devices 110. The device affinity model(s) 845 may determine a frequency at which such speech controllable devices are used to operate the devices 110. For example, device affinity data may be received by the device affinity model(s) 845 for identifying which devices 110 are operated by which speech controllable devices and frequencies associated with such operations.

A control rate may be identified for each pair of speech controllable device and device 110. For example, a control rate of 0.9 may be determined for the interaction of a first device 110 with a first speech controllable device, a control rate of 0.1 may be determined for the interaction of the first device 110 with a second speech controllable device, a control rate of 0.8 may be determined for the interaction of a second device 110 with the first speech controllable device, a control rate of 0.2 may be determined for the interaction of the second device 110 with the second speech controllable device, etc. In this example, the device affinity model(s) 845 may determine that the first device and the second device are frequently controlled by the first speech controllable device, making those devices candidates for target device resolution when the spoken natural language input is received from the first speech controllable device. In examples, a threshold control rate may be established and may be used to determine if a device 110 is controlled by a particular speech controllable device with enough frequency to make the device 110 a candidate for target device resolution.

In addition to, or instead of, using the linguistics model(s) 825 and/or the device activation model(s) 840 and/or the device affinity model(s) 845, the system(s) 800 may use the location model(s) 830 to perform target device resolution. For example, the location model(s) 830 may use the device identifying information from the spoken natural language input to determine if the device identifying information corresponds to an environment naming, such as "kitchen," "office," "living room," etc. The features generated by the location model(s) 830 may include confidence scores associated with environment names, with the most favorable score being associated with the environment name that most closely corresponds to the device identifying information. For example, if the spoken natural language input includes "turn on the kitchen lights," the location model(s) 830 may identify "kitchen" as the device identifying information and may use that information to determine which device 110 associated with the "kitchen" and/or with a name of "kitchen" is most likely to correspond to "kitchen lights" from the spoken natural language input. Additionally, or alternatively, the location model(s) 830 may be configured to receive weather data indicating weather conditions at or near a location where the speech controllable device and/or the devices 110 are situated. The weather data may be used to determine, for example, lighting conditions at the location and/or within a given space. For example, in instances where the weather data indicates that it is currently sunny and 95 degrees at the location, it may be less likely that the spoken natural language input corresponds to a request to turn on lights in a living room area. For further example, in instances where the weather data indicates it is currently cloudy and/or rainy, it may be more likely that the spoken natural language input corresponds to a request to turn on lights in a living room area.

Additionally, or alternatively, the system(s) 800 may be configured to use prior request data to generate features that include prior request scores. For example, multiple devices 110 may be associated with a speech controllable device, and the prior request data may indicate a time at which a given device 110 was operated in response to a spoken natural language input. The device 110 that was operated closest in time to when the spoken natural language input was received may be more likely to correspond to the target device than other devices 110. For example, a previous spoken natural language input may have been "turn on bedroom light." Thereafter, another spoken natural language input received 10 minutes later may be "turn off light." The prior request data may indicate the time at which the bedroom light was turned on, and upon receiving the spoken natural language input of "turn off light," the system(s) 800 may determine a prior request score as a feature for input into the classification model(s) 835.

Additionally, or alternatively, the system(s) 800 may be configured to use current device state to generate features that include device state scores. For example, devices 110 may be associated with states, such as "on," "off," "idle," "active," etc. A spoken input may include "turn off the light." In this example, the intent may be to deactivate or otherwise turn off a device 110, but device identifying information was not provided in the spoken input. However, only a portion or only one device 110 may be in a state that is "on" or similar, and this information can be used by the system(s) 800 to determine that other devices 110 that are already in an "off" state are not likely candidates for target device resolution. Device state scores may be determined by the system(s) 800 as features for input into the classification model(s) 835.

Additionally, or alternatively, the semantic grouping component 820 may be configured to use the device identifying information from the spoken natural language input to determine semantic similarities and affinities to identify the device 110 most likely to correspond to the device identifying information, even in instances where the name for the device 110 has not been setup by the user and/or is associated with a default name, such as "light A," for example. For example, a spoken natural language input may include "turn on cooking lights," but the speech controllable device, that received the spoken natural language input, is not associated with a device 110 with the name of "cooking lights." The semantic grouping component 820 may determine a semantic similarity between the word "cooking" and one or more words from names typically used for devices 110. For example, the system(s) 800 may determine that "cooking" is semantically similar to "kitchen." The system(s) 800 may then determine similarities between the semantically-similar word, here "kitchen," and device group names and/or names for speech controllable devices.

For example, the user may have assigned or otherwise selected "kitchen" as a name for a device group that includes devices 110 located in the kitchen associated with the user, and/or the user may have assigned or otherwise selected "kitchen" as a name for the speech controllable device. Additionally, or alternatively, usage data aggregated from use of speech controllable devices in one or more other spaces may be used to determine that "cooking light" frequently refers to a device 110 with a "light" device type that is generally given a name with the word "kitchen." Some or all of this information may be used by the semantic grouping component 820 to determine that the device 110 with the default name "light A," which is associated with the "kitchen" device group, and/or is associated with the "kitchen" speech controllable device, and/or that is associated with the usage data may be given the name "kitchen light," and may be acted upon in response to the spoken natural language input "turn on cooking light."

The features generated by the linguistics model(s) 825, the device activation model(s) 840, the device affinity model(s) 845, the location model(s) 830, and/or the semantic grouping component 820 may be stored, in examples, in a feature(s) storage 850 and may be retrieved by the classification model(s) 835 to perform target device resolution. For example, device affinity scores may be predetermined before the spoken natural language input is received, and the corresponding features may be stored in the feature(s) storage 850.

In examples, the target inference component 810 may be unable to determine which device 110 should be acted upon in light of the spoken natural language input and/or may be able to determine which device 110 should be acted upon below a threshold confidence level. In these and other examples, the process may default to identifying the device 110 using Levenshtein distances. Levenshtein distances may include a string metric for measuring the distance between two sequences. For example, the Levenshtein distance between two words is the minimum number of single-character edits required to change one word into the other. These techniques may be used to determine the Levenshtein distance between device identifying information from the spoken natural language input and names associated with devices 110, with the shortest Levenshtein distance indicating the names to be selected by the system(s) 800.

Based at least in part on the features as described herein, the classification model(s) 835 may determine which device(s) 110 is most likely to correspond to the device(s) intended to be acted upon. For example, the classification model(s) 835 may generate output data representing a ranked list of the devices 110, with the highest ranking device 110 being the most likely device to be acted upon. The target inference component 810 may provide the name and/or device identifier of the highest ranking device 110 to the smart-home skill 805, for example, to generate directive data. The directive data may represent a directive for the speech controllable device and/or other components of the system(s) 800 to perform a directive, such as activation and/or deactivation, on the highest-ranking device 110. Additionally, or alternatively, the TTS component 280/380 may generate audio data representing a request for the user of the speech controllable device to confirm that the identified device 110 is the device the user intended for the system(s) 800 to act upon. Audio data representing the response of the user may be received at the system 120 for processing, and if the response confirms that the device 110 was selected accurately by the system(s) 800, the directive data may be sent to the speech controllable device.

Additionally, or alternatively, user responses to the target device resolution processes described herein may be used by the training component 815 to train the one or more models of the system(s) 800 and/or to generate new models to be used for target device resolution. The training component 815 may receive feedback data representing an indication that the target device corresponds to a given device 110 and may generate, based at least in part on the feedback data, training data representing the indication as a target attribute. The training component 815 may determine an association between the target attribute and at least one of the features or at least a portion of intent data as generated by the NLU component 260/360, and may generate, based at least in part on the association, a new classification model(s) to be used in place of the previous classification model(s) 835.

Figure 9:
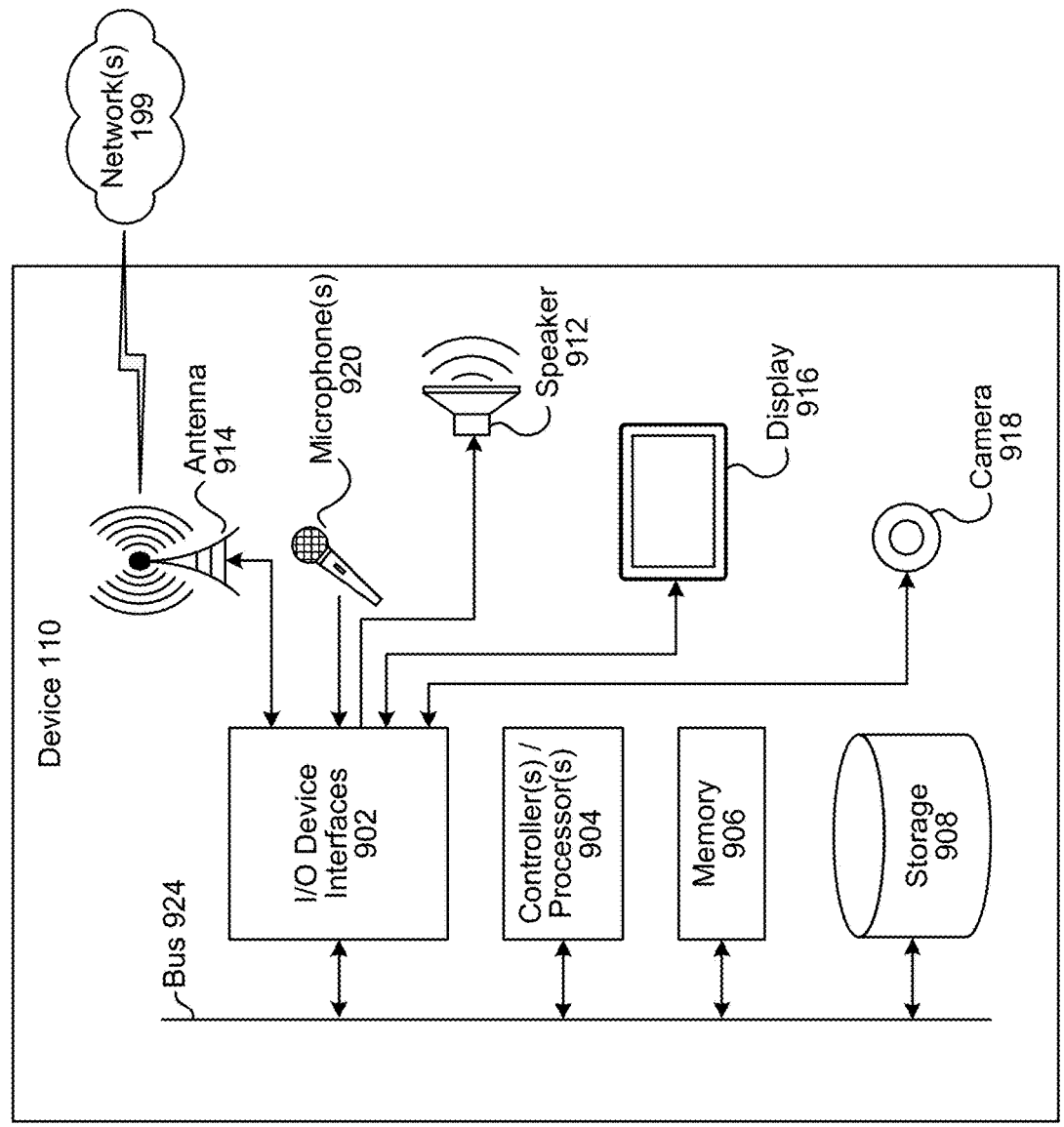
FIG. 9 is a block diagram conceptually illustrating example components of a device, according to embodiments of the present disclosure.
Figure 10:
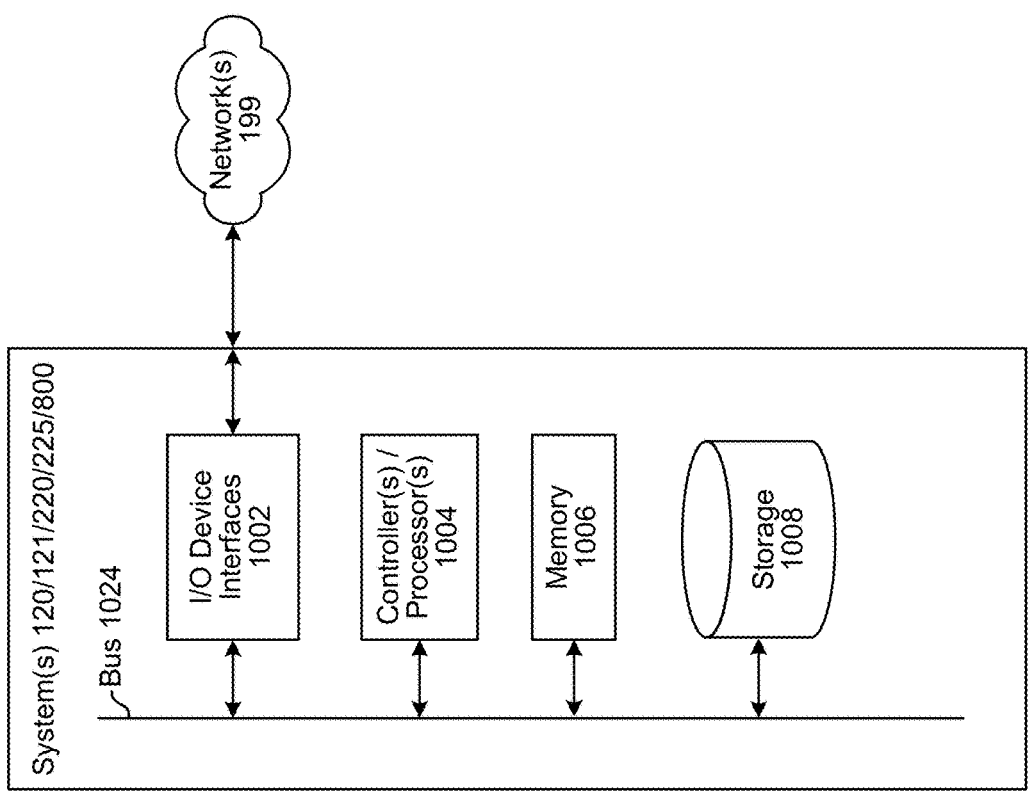
FIG. 10 is a block diagram conceptually illustrating example components of a system, according to embodiments of the present disclosure.

FIG. 9 is a block diagram conceptually illustrating a device 110 of the system 100. FIG. 10 is a block diagram conceptually illustrating example components of a remote device, such as the AED system(s) 120, the notification system(s) 121, the system(s) 220, the system(s) 800 and the skill(s) system 225. A system (120/121/220/225/800) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/121/220/225/800) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/121/220/225/800) may be included in the system 100 of the present disclosure, such as, one or more AED systems 120, one or more notification systems 121, one or more systems 220, one or more systems 800 and/or one or more skills 225. In operation, each of these systems may include computer-readable and computer-executable instructions that reside on the respective device (120/121/220/225/800), as will be discussed further below.

Each of these devices (110/120/121/220/225/800) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/121/220/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/121/220/225) may also be connected to removable or external non-volatile memory and/or storage (such as a removable memory card, memory key drive, networked storage, etc.) through respective input/output device interfaces (902/1002).

Computer instructions for operating each device (110/120/121/220/225/800) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/121/220/225/800) includes input/output device interfaces (902/1002). A variety of components may be connected through the input/output device interfaces (902/1002), as will be discussed further below. Additionally, each device (110/120/121/220/225) may include an address/data bus (924/1024) for conveying data among components of the respective device. Each component within a device (110/120/121/220/225/800) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system(s) 220, the system(s) 800, and/or skill 225 may include their own dedicated processors, memory, and/or storage. Alternatively, one or more of the components of the device 110, the system(s) 220, and/or skill 225 may utilize the I/O interfaces (902/1002), processor(s) (904/1004), memory (906/1006), and/or storage (908/1008) of the device 110, the AED system(s) 120, the notification system(s) 121, the system(s) 220, the system(s) 800 and/or skill 225, respectively.

As noted above, multiple devices may be employed in a single system. In such a multi-device system, each of the devices may include different components for performing different aspects of the system's processing. The multiple devices may include overlapping components. The components of the device 110, the system(s) 220, the system(s) 800, and the skill system 225, as described herein, are illustrative, and may be located as a stand-alone device or may be included, in whole or in part, as a component of a larger device or system.

Figure 11:
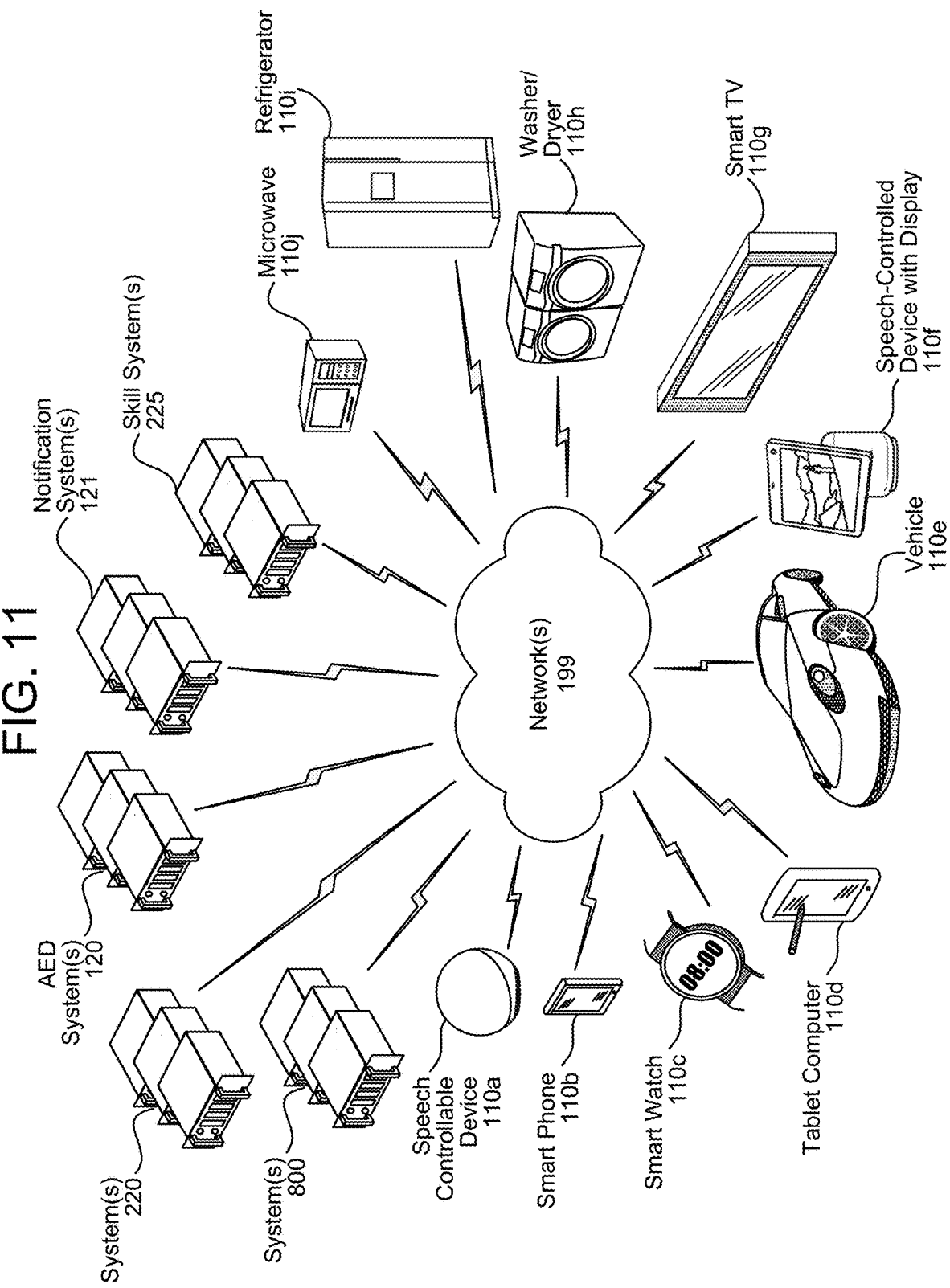
FIG. 11 illustrates an example of a computer network for use with the overall system, according to embodiments of the present disclosure.

As illustrated in FIG. 11, multiple devices (110*a*-110*j*, 120, 121, 220, 225, 800) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110*a*, a smart phone 110*b*, a smart watch 110*c*, a tablet computer 110*d*, a vehicle 110*e*, a speech-controllable display device 110*f*, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the AED system(s) 120, the notification system(s) 121, the system(s) 220, the system(s) 800, the skill 225, and/or others. The support devices may connect to the network(s) 199 through a wired connection or wireless connection.

The concepts disclosed herein may be applied within a number of different devices and computer systems, including, for example, general-purpose computing systems, speech-processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving a first user input representing a first natural language description of a first acoustic event to be detected for a user profile;
determining, using graph data, first audio embedding data corresponding to the first natural language description, the first audio embedding data being determined using audio data that was available prior to receipt of the first user input, and the graph data representing an association between at least the first audio embedding data and at least the first natural language description;
receiving, from a first device associated with the user profile, first audio data;
processing the first audio data with respect to the first audio embedding data to determine first similarity data;

based at least in part on the first similarity data, determining that the first audio data is a first potential sample of the first acoustic event;
in response to determining that the first audio data is the first potential sample, determining acoustic event profile data using the first audio data;
associating the acoustic event profile data with the user profile;
after determining the acoustic event profile data, receiving, from the first device, second audio data;
processing the second audio data with respect to the acoustic event profile data to determine second similarity data;
based at least in part on the second similarity data, determining that the second audio data represents occurrence of the first acoustic event; and
in response to the second audio data representing occurrence of the first acoustic event, sending, to a second device, first output data indicating that the first acoustic event occurred.

2. The computer-implemented method of claim 1, further comprising:
receiving, from the second device, a second user input representing a second natural language description of a second acoustic event;
determining word embedding data corresponding to the second natural language description;
determining, using the graph data, a third natural language description corresponding to the word embedding data, wherein the graph data represents associations between at least the second natural language description and the third natural language description;
sending, to the second device, second output data requesting confirmation of the third natural language description corresponding to the second acoustic event;
receiving, from the second device, third user input representing the third natural language description corresponds to the second acoustic event; and
based on the third natural language description corresponding to the second acoustic event, determining, using the graph data, second audio embedding data corresponding to the third natural language description, the second audio embedding data.

3. The computer-implemented method of claim 1, further comprising:
receiving, from the first device, third audio data;
determining second audio embedding data corresponding to the third audio data;
determining third similarity data representing a cosine similarity between the first audio embedding data and the second audio embedding data;
based at least in part on the third similarity data, sending, to the second device associated with the user profile, the third audio data and second output data requesting confirmation that the third audio data represents occurrence of the first acoustic event;
receiving, from the second device, a second user input representing that the third audio data represents occurrence of the first acoustic event; and
in response to receiving the second user input, determining updated acoustic event profile data using the acoustic event profile data and the third audio data.

4. The computer-implemented method of claim 1, further comprising:
receiving third audio data associated with a second natural language description;
receiving fourth audio data associated with a third natural language description;
determining the first audio embedding data corresponding to the third audio data;
determining second audio embedding data corresponding to the fourth audio data;
determining first graph data including a first node representing the first audio embedding data, a second node representing the second audio embedding data, and a first association between the first node and the second node based on a similarity between the first audio embedding data and the second audio embedding data;
determining, using an encoder, first word embedding data corresponding to the second natural language description;
determining, using the encoder, second word embedding data corresponding to the third natural language description;
determining second graph data including a third node representing the first word embedding data, a fourth node representing the second word embedding data, and a second association between the third node and the fourth node based on a semantic similarity between the first word embedding data and the second word embedding data;
processing the first graph data and the second graph data using a machine learning model to determine a third association between the first audio embedding data and the first word embedding data and a fourth association between the second audio embedding data and the second word embedding data; and
storing the third association and the fourth association as the graph data.

5. A computer-implemented method comprising:
receiving a first user input representing a first natural language description corresponding to a first acoustic event to be detected;
determining, based at least in part on stored data, first audio data corresponding to the first natural language description, wherein the stored data was available prior to receipt of the first user input;
determining, using the first audio data, first acoustic event profile data corresponding to the first acoustic event, the first acoustic event profile data associated with a user profile;
after determining the first acoustic event profile data, receiving second audio data associated with the user profile;
determining first similarity data using the first acoustic event profile data and the second audio data;
based at least in part on the first similarity data, determining that the second audio data represents occurrence of the first acoustic event; and
causing presentation of first output data indicating occurrence of the first acoustic event.

6. The computer-implemented method of claim 5, further comprising:
receiving third audio data associated with the user profile;
determining second similarity data using the third audio data and the first audio data;
based at least in part on the second similarity data, determining that the third audio data is a potential sample of the first acoustic event; and
in response to determining that the third audio data is the potential sample, determining the first acoustic event profile data using the first audio data and the third audio data.

7. The computer-implemented method of claim 5, further comprising:
receiving, from a first device associated with the user profile, a second user input representing a second natural language description of a second acoustic event to be detected;
determining word embedding data corresponding to the second natural language description;
determining a third natural language description corresponding to the word embedding data;
sending, to the first device, second output data requesting confirmation of the third natural language description corresponding to the second acoustic event;
receiving, from the first device, third user input representing the third natural language description corresponds to the second acoustic event;
based on the third natural language description corresponding to the second acoustic event, determining third audio data corresponding to the third natural language description, the third audio data being available prior to receipt of the second user input; and
determining, using the third audio data, second acoustic event profile data corresponding to the second acoustic event.

8. The computer-implemented method of claim 5, further comprising:
receiving, from a first device associated with the user profile, third audio data;
determining second similarity data using the third audio data and the first audio data;
based at least in part on the second similarity data, sending, to a second device associated with the user profile, the third audio data and second output data requesting confirmation that the third audio data represents occurrence of the first acoustic event;
receiving, from the second device, a second user input representing that the third audio data represents occurrence of the first acoustic event; and
in response to receiving the second user input, determining the first acoustic event profile data using the first audio data the third audio data.

9. The computer-implemented method of claim 5, further comprising:
receiving the first audio data from a component, the first audio data associated with a second natural language description;
receiving third audio data from the component, the third audio data associated with a third natural language description;
determining first audio embedding data corresponding to the first audio data;
determining second audio embedding data corresponding to the third audio data;
determining first graph data using the first audio embedding data and the second audio embedding data;
determining first word embedding data corresponding to the second natural language description;
determining second word embedding data corresponding to the third natural language description;
determining second graph data using the first word embedding data and the second word embedding data;
determining first data associating the first audio embedding data and the first word embedding data; and
determining second data associating the second audio embedding data and the second word embedding data.

10. The computer-implemented method of claim 9, further comprising:

determining third word embedding data corresponding to the first natural language description;
determining, using the second graph data, second similarity data representing a similarity between the third word embedding data and the first word embedding data;
based at least in part on the second similarity data, determining, using the first graph data and the first data, the first audio data associated with the first word embedding data; and
based at least in part on the second similarity data, determining that the first audio data corresponds to the first natural language description.

11. The computer-implemented method of claim 5, further comprising:
determining first audio embedding data corresponding to the first audio data;
storing the first audio embedding data as the first acoustic event profile data;
determining second audio embedding data corresponding to the second audio data;
determining the first similarity data based on a cosine similarity between the first audio embedding data and the second audio embedding data; and
based on the first similarity data satisfying a condition, determining that the second audio data represents occurrence of the first acoustic event.

12. The computer-implemented method of claim 5, further comprising:
receiving the second audio data from a first device associated with the user profile;
determining the first output data including a representation of the first natural language description and indicating occurrence of the first acoustic event; and
sending the first output data to a second device associated with the user profile.

13. A system comprising:
at least one processor; and
at least one memory including instructions that, when executed by the at least one processor, cause the system to:
receive a first user input representing a first natural language description corresponding to a first acoustic event to be detected;
determine, based at least in part on stored data, first audio data corresponding to the first natural language description, wherein the stored data was available prior to receipt of the first user input;
determine, using the first audio data, first acoustic event profile data corresponding to the first acoustic event, the first acoustic event profile data associated with a user profile;
after determining the first acoustic event profile data, receive second audio data associated with the user profile;
determine first similarity data using the first acoustic event profile data and the second audio data;
based at least in part on the first similarity data, determine that the second audio data represents occurrence of the first acoustic event; and
cause presentation of first output data indicating occurrence of the first acoustic event.

14. The system of claim 13, wherein the at least one memory includes further instructions that, when executed by the at least one processor, further cause the system to:
receive third audio data associated with the user profile;

determine second similarity data using the third audio data and the first audio data;

based at least in part on the second similarity data, determine that the third audio data is a potential sample of the first acoustic event; and in response to determining that the third audio data is the potential sample, determine the first acoustic event profile data using the first audio data and the third audio data.

15. The system of claim 13, wherein the at least one memory includes further instructions that, when executed by the at least one processor, further cause the system to:

receive, from a first device associated with the user profile, a second user input representing a second natural language description of a second acoustic event to be detected;

determine word embedding data corresponding to the second natural language description;

determine a third natural language description corresponding to the word embedding data;

send, to the first device, second output data requesting confirmation of the third natural language description corresponding to the second acoustic event;

receive, from the first device, third user input representing the third natural language description corresponds to the second acoustic event;

based on the third natural language description corresponding to the second acoustic event, determine third audio data corresponding to the third natural language description, the third audio data being available prior to receipt of the second user input; and determine, using the third audio data, second acoustic event profile data corresponding to the second acoustic event.

16. The system of claim 13, wherein the at least one memory includes further instructions that, when executed by the at least one processor, further cause the system to:

receive, from a first device associated with the user profile, third audio data;

determine second similarity data using the third audio data and the first audio data;

based at least in part on the second similarity data, send, to a second device associated with the user profile, the third audio data and second output data requesting confirmation that the third audio data represents occurrence of the first acoustic event;

receive, from the second device, a second user input representing that the third audio data represents occurrence of the first acoustic event; and in response to receiving the second user input, determine the first acoustic event profile data using the first audio data the third audio data.

17. The system of claim 13, wherein the at least one memory includes further instructions that, when executed by the at least one processor, further cause the system to:

receive the first audio data from a component, the first audio data associated with a second natural language description;

receive third audio data from the component, the third audio data associated with a third natural language description;

determine first audio embedding data corresponding to the first audio data;

determine second audio embedding data corresponding to the third audio data;

determine first graph data using the first audio embedding data and the second audio embedding data;

determine first word embedding data corresponding to the second natural language description;

determine second word embedding data corresponding to the third natural language description;

determine second graph data using the first word embedding data and the second word embedding data;

determine first data associating the first audio embedding data and the first word embedding data; and determine second data associating the second audio embedding data and the second word embedding data.

18. The system of claim 17, wherein the at least one memory includes further instructions that, when executed by the at least one processor, further cause the system to:

determine third word embedding data corresponding to the first natural language description;

determine, using the second graph data, second similarity data representing a similarity between the third word embedding data and the first word embedding data;

based at least in part on the second similarity data, determine, using the first graph data and the first data, the first audio data associated with the first word embedding data; and based at least in part on the second similarity data, determine that the first audio data corresponds to the first natural language description.

19. The system of claim 13, wherein the at least one memory includes further instructions that, when executed by the at least one processor, further cause the system to:

determine first audio embedding data corresponding to the first audio data;

store the first audio embedding data as the first acoustic event profile data;

determine second audio embedding data corresponding to the second audio data;

determine the first similarity data based on a cosine similarity between the first audio embedding data and the second audio embedding data; and based on the first similarity data satisfying a condition, determine that the second audio data represents occurrence of the first acoustic event.

20. The system of claim 13, wherein the at least one memory includes further instructions that, when executed by the at least one processor, further cause the system to:

receive the second audio data from a first device associated with the user profile;

determine the first output data including a representation of the first natural language description and indicating occurrence of the first acoustic event; and send the first output data to a second device associated with the user profile.

* * * * *